United States Patent
Oelze et al.

(10) Patent No.: US 12,392,877 B2
(45) Date of Patent: Aug. 19, 2025

(54) SYSTEMS AND METHODS FOR CONTINUOUS ULTRAFAST ULTRASOUND BEAMFORMING WITH PROGRAMMABLE LOGIC

(71) Applicant: The Board of Trustees of the University of Illinois, Urbana, IL (US)

(72) Inventors: Michael Oelze, Mahomet, IL (US); Pengfei Song, Champaign, IL (US); Zhengchang Kou, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 104 days.

(21) Appl. No.: 18/365,777

(22) Filed: Aug. 4, 2023

(65) Prior Publication Data
US 2024/0045043 A1    Feb. 8, 2024

Related U.S. Application Data

(60) Provisional application No. 63/370,642, filed on Aug. 5, 2022.

(51) Int. Cl.
G01S 7/52 (2006.01)
G01S 15/89 (2006.01)

(52) U.S. Cl.
CPC ...... G01S 7/52046 (2013.01); G01S 7/52087 (2013.01); G01S 7/52095 (2013.01); G01S 15/8927 (2013.01)

(58) Field of Classification Search
CPC ............ G01S 7/52046; G01S 7/52087; G01S 7/52095; G01S 15/8927
See application file for complete search history.

(56) References Cited

U.S. PATENT DOCUMENTS

2007/0038108 A1* 2/2007 Hao .................. A61B 8/06
  600/454
2007/0229336 A1* 10/2007 Liu .................... G01S 7/52025
  341/143

(Continued)

FOREIGN PATENT DOCUMENTS

CN    110927254 B    3/2020
WO    2019094580 A1   5/2019

OTHER PUBLICATIONS

Ahn, Sewoong, et al. "Smartphone-based portable ultrasound imaging system: Prototype implementation and evaluation." 2015 IEEE International Ultrasonics Symposium (IUS). IEEE, 2015.

(Continued)

Primary Examiner — Dixomara Vargas
(74) Attorney, Agent, or Firm — Quarles & Brady LLP

(57) ABSTRACT

Systems and methods for ultrafast imaging include: a memory having stored thereon a delay profile matrix and a field programmable gate array (FPGA) coupled with the memory. The delay profile matrix comprises a two-dimensional matrix in which each row corresponds to a delay profile at a particular depth. The FPGA is configured to: acquire radio frequency (RF) ultrasound data from a subject; load a delay profile from the delay profile matrix to a memory buffer of the FPGA, wherein the delay profile corresponds to a particular depth; read a first row of the RF ultrasound data based on a first delay value of the delay profile; generate beamformed data at the particular depth by beamforming the first row of RF ultrasound data; and generate an image of the subject based on the beamformed data.

20 Claims, 14 Drawing Sheets

(56) References Cited

U.S. PATENT DOCUMENTS

| | | | |
|---|---|---|---|
| 2007/0239001 A1* | 10/2007 | Mehi | G10K 11/346 600/437 |
| 2017/0108584 A1 | 4/2017 | Oelze et al. | |
| 2018/0206820 A1 | 7/2018 | Anand et al. | |
| 2019/0285746 A1 | 9/2019 | Tan | |

OTHER PUBLICATIONS

Amaro, Joao, et al. "Software-based high-level synthesis design of FPGA beamformers for synthetic aperture imaging." IEEE Transactions on Ultrasonics, Ferroelectrics, and Frequency Control 62.5 (2015): 862-870.

Bercoff, Jérémy, Mickael Tanter, and Mathias Fink. "Supersonic shear imaging: a new technique for soft tissue elasticity mapping." IEEE transactions on ultrasonics, ferroelectrics, and frequency control 51.4 (2004): 396-409.

Bercoff, Jeremy, et al. "Ultrafast compound Doppler imaging: Providing full blood flow characterization." IEEE transactions on ultrasonics, ferroelectrics, and frequency control 58.1 (2011): 134-147.

Boni, Enrico, et al. "ULA-OP 256: A 256-channel open scanner for development and real-time implementation of new ultrasound methods." IEEE transactions on ultrasonics, ferroelectrics, and frequency control 63.10 (2016): 1488-1495.

Boni, Enrico, et al. "Architecture of an ultrasound system for continuous real-time high frame rate imaging." IEEE transactions on ultrasonics, ferroelectrics, and frequency control 64.9 (2017): 1276-1284.

Campbell, Nicholas A., and Jeremy A. Brown. "A real-time dual-mode high-frequency beamformer for ultrafast and focused imaging." IEEE Transactions on Ultrasonics, Ferroelectrics, and Frequency Control 69.4 (2022): 1268-1276.

Chavignon, Arthur, et al. "3D transcranial ultrasound localization microscopy in the rat brain with a multiplexed matrix probe." IEEE Transactions on Biomedical Engineering 69.7 (2021): 2132-2142.

Corradi, Giulio, and Jørgen Arendt Jensen. "Real time synthetic aperture and plane wave ultrasound imaging with the xilinx versal™ simd-vliw architecture." 2020 IEEE International Ultrasonics Symposium (IUS). IEEE, 2020.

Demené, Charlie, et al. "Transcranial ultrafast ultrasound localization microscopy of brain vasculature in patients." Nature biomedical engineering 5.3 (2021): 219-228.

Di Ianni, Tommaso, et al. "System-level design of an integrated receiver front end for a wireless ultrasound probe." IEEE transactions on ultrasonics, ferroelectrics, and frequency control 63.11 (2016): 1935-1946.

Giangrossi, Claudio, et al. "Virtual real-time for high PRF multiline vector doppler on ULA-OP 256." IEEE Transactions on Ultrasonics, Ferroelectrics, and Frequency Control 68.3 (2020): 624-631.

Hager, Pascal Alexander, and Luca Benini. "LightProbe: A digital ultrasound probe for software-defined ultrafast imaging." IEEE transactions on ultrasonics, ferroelectrics, and frequency control 66.4 (2019): 747-760.

Huang, Chengwu, et al. "Short acquisition time super-resolution ultrasound microvessel imaging via microbubble separation." Scientific reports 10.1 (2020): 6007.

Hyun, Dongwoon, et al. "An open source GPU-based beamformer for real-time ultrasound imaging and applications." 2019 IEEE International Ultrasonics Symposium (IUS). IEEE, 2019.

Ibrahim, Aya, et al. "Efficient sample delay calculation for 2-D and 3-D ultrasound imaging." IEEE transactions on biomedical circuits and systems 11.4 (2017): 815-831.

Ibrahim, Aya, et al. "Towards ultrasound everywhere: A portable 3D digital back-end capable of zone and compound imaging." IEEE transactions on biomedical circuits and systems 12.5 (2018): 968-981.

Kidav, Jayaraj U. "An FPGA-accelerated parallel digital beamforming core for medical ultrasound sector imaging." IEEE Transactions on Ultrasonics, Ferroelectrics, and Frequency Control 69.2 (2021): 553-564.

Kim, Gi-Duck, et al. "A single FPGA-based portable ultrasound imaging system for point-of-care applications." IEEE transactions on ultrasonics, ferroelectrics, and frequency control 59.7 (2012): 1386-1394.

Kou, Zhengchang, Andrew C. Singer, and Michael L. Oelze. "Through Tissue Ultra-high-definition Video Transmission Using an Ultrasound Communication Channel." arXiv preprint arXiv:2210.09489 (2022).

Kou, Zhengchang, et al. "High-resolution Power Doppler Using Null Subtraction Imaging." arXiv preprint arXiv:2301.03719 (2023).

Kou, Zhengchang, et al. "High-level synthesis design of scalable ultrafast ultrasound beamformer with single FPGA." IEEE Transactions on Biomedical Circuits and Systems (2023).

Lowerison, Matthew R., et al. "Ultrasound localization microscopy of renal tumor xenografts in chicken embryo is correlated to hypoxia." Scientific reports 10.1 (2020): 2478.

Macé, Emilie, et al. "Functional ultrasound imaging of the brain." Nature methods 8.8 (2011): 662-664.

Qian, Xuejun, et al. "Current ultrasound technologies and instrumentation in the assessment and monitoring of COVID-19 positive patients." IEEE transactions on ultrasonics, ferroelectrics, and frequency control 67.11 (2020): 2230-2240.

Risser, Christoph, et al. "High channel count ultrasound beamformer system with external multiplexer support for ultrafast 3D/4D ultrasound." 2016 IEEE International Ultrasonics Symposium (IUS). IEEE, 2016.

Risser, Christoph, et al. "Real-time volumetric ultrasound research platform with 1024 parallel transmit and receive channels." Applied Sciences 11.13 (2021): 5795.

Sampson, Richard, et al. "Sonic Millip3De: an architecture for handheld 3D ultrasound." IEEE Micro 34.3 (2014): 100-108.

Simon, W., et al. "Single-FPGA, scalable, low-power, and high-quality 3D ultrasound beamformer." 2016 26th International Conference on Field Programmable Logic and Applications (FPL). Ieee, 2016.

Song, Pengfei, et al. "Comb-push ultrasound shear elastography (CUSE): a novel method for two-dimensional shear elasticity imaging of soft tissues." IEEE transactions on medical imaging 31.9 (2012): 1821-1832.

Song, Pengfei, et al. "Ultrasound small vessel imaging with block-wise adaptive local clutter filtering." IEEE transactions on medical imaging 36.1 (2016): 251-262.

Song, Pengfei, et al. "Improved super-resolution ultrasound microvessel imaging with spatiotemporal nonlocal means filtering and bipartite graph-based microbubble tracking." IEEE transactions on ultrasonics, ferroelectrics, and frequency control 65.2 (2017): 149-167.

Song, Pengfei, et al. "On the effects of spatial sampling quantization in super-resolution ultrasound microvessel imaging." IEEE transactions on ultrasonics, ferroelectrics, and frequency control 65.12 (2018): 2264-2276.

Tang, Shanshan, et al. "Kalman filter-based microbubble tracking for robust super-resolution ultrasound microvessel imaging." IEEE transactions on ultrasonics, ferroelectrics, and frequency control 67.9 (2020): 1738-1751.

Tanter, Mickael, and Mathias Fink. "Ultrafast imaging in biomedical ultrasound." IEEE transactions on ultrasonics, ferroelectrics, and frequency control 61.1 (2014): 102-119.

Tiran, Elodie, et al. "Multiplane wave imaging increases signal-to-noise ratio in ultrafast ultrasound imaging." Physics in Medicine & Biology 60.21 (2015): 8549.

Tomov, Borislav Gueorguiev, and Jørgen Arendt Jensen. "Compact FPGA-based beamformer using oversampled 1-bit A/D converters." IEEE transactions on ultrasonics, ferroelectrics, and frequency control 52.5 (2005): 870-880.

West, Brendan L., et al. "Tetris: Using software/hardware Co-design to enable handheld, physics-limited 3D plane-wave ultrasound imaging." IEEE Transactions on Computers 69.8 (2020): 1209-1220.

(56) References Cited

OTHER PUBLICATIONS

West, Brendan L., et al. "Delay Compression: Reducing Delay Calculation Requirements for 3D Plane-Wave Ultrasound." 2019 IEEE International Ultrasonics Symposium (IUS). IEEE, 2019.

Xu, Xiaochen, et al. "A Programmable Platform for Accelerating the Development of Smart Ultrasound Transducer Probe." IEEE Transactions on Ultrasonics, Ferroelectrics, and Frequency Control 68.4 (2020): 1296-1304.

Yiu, Billy YS, Ivan KH Tsang, and C. H. Alfred. "GPU-based beamformer: Fast realization of plane wave compounding and synthetic aperture imaging." IEEE transactions on ultrasonics, ferroelectrics, and frequency control 58.8 (2011): 1698-1705.

Yiu, Billy YS, et al. "Live ultrasound color-encoded speckle imaging platform for real-time complex flow visualization in vivo." IEEE Transactions on Ultrasonics, Ferroelectrics, and Frequency Control 66.4 (2019): 656-668.

* cited by examiner

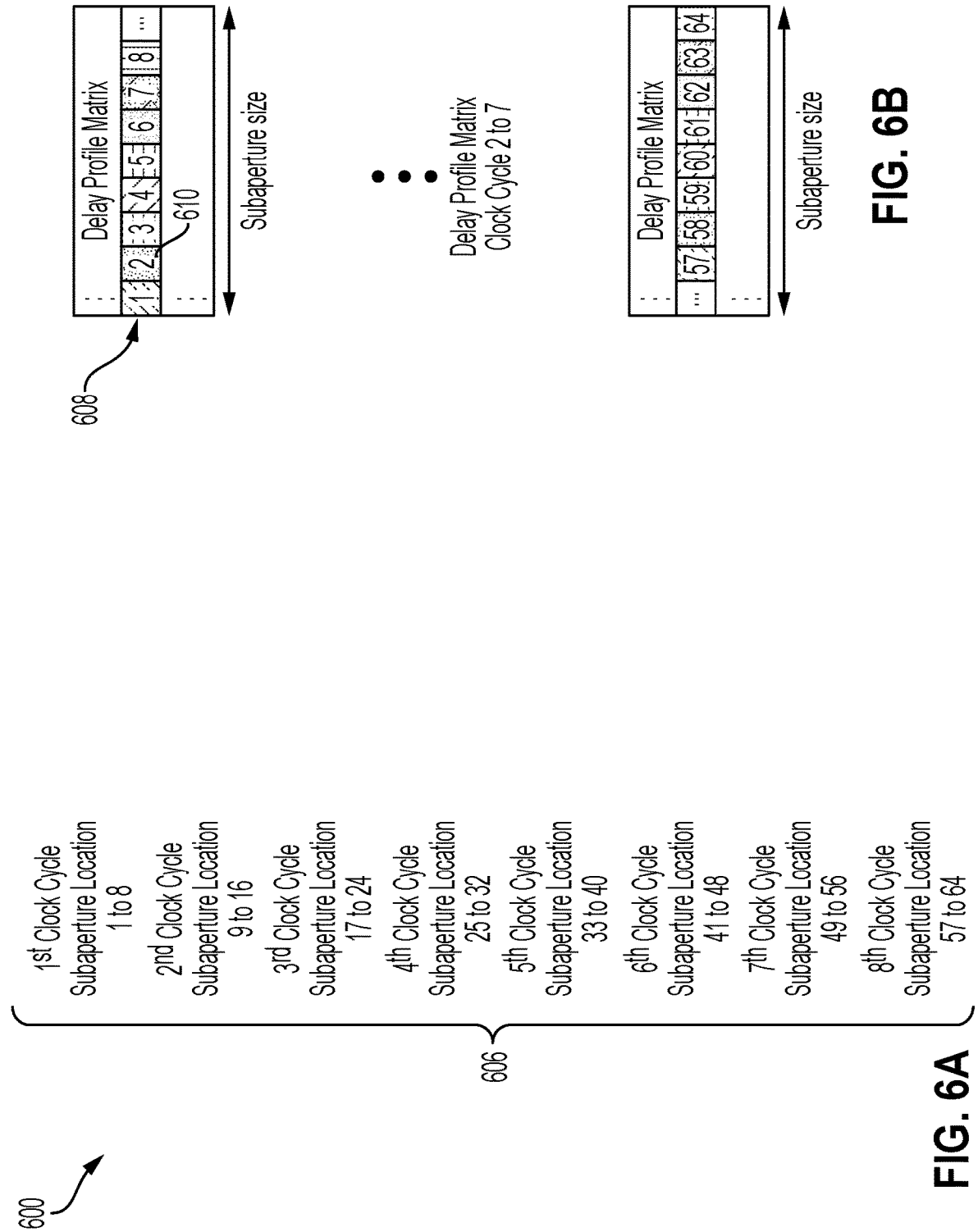

FIG. 8

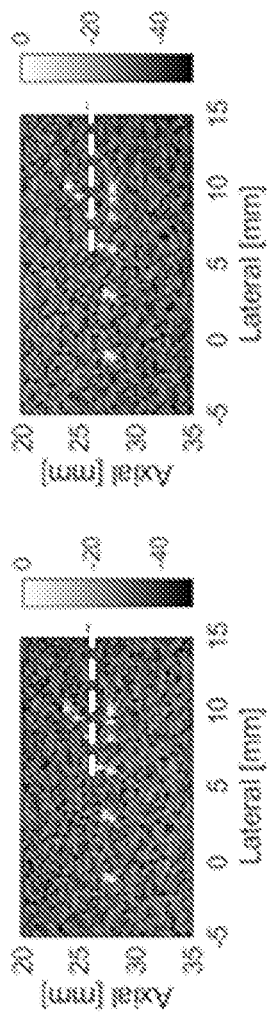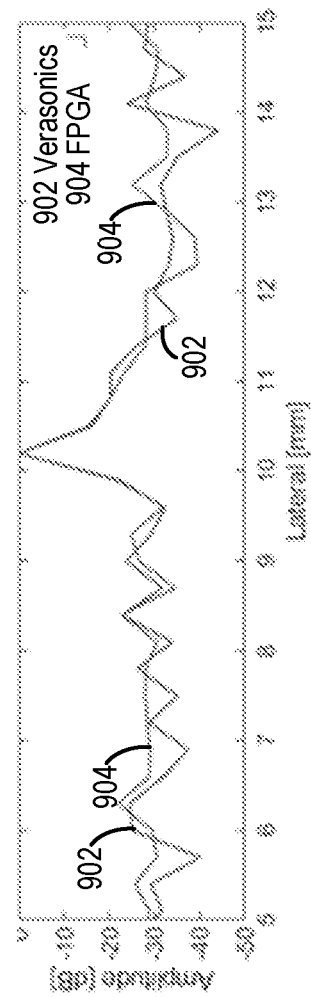
FIG. 9A  FIG. 9B  FIG. 9C

SYSTEMS AND METHODS FOR CONTINUOUS ULTRAFAST ULTRASOUND BEAMFORMING WITH PROGRAMMABLE LOGIC

CROSS-REFERENCE TO RELATED APPLICATIONS

This application claims the benefit of U.S. Provisional Patent Application Ser. No. 63/370,642, filed Aug. 5, 2022, the disclosure of which is hereby incorporated by reference in its entirety, including all figures, tables, and drawings.

STATEMENT OF FEDERALLY SPONSORED RESEARCH

This invention was made with government support under EB024133 and EB030072 awarded by the National Institutes of Health. The government has certain rights in the invention.

BACKGROUND

Ultrafast ultrasound imaging is a technique that allows for imaging of dynamic processes in the body, such as cardiac contractions or blood flow through vessels. To image tissues in the body, ultrafast ultrasound imaging techniques transmit ultrasound waves from a probe, receive echoes in response thereto, and use a beamforming technique to convert the echoes into readable image data of the tissue being probed. However, this beamforming uses large amounts of working memory and requires large data transmitting rates. Thus, current recording time on available systems is limited because the data transfer rate of raw RF data recorded using ultrafast ultrasound is beyond the storage capabilities of conventionally used hardware components.

SUMMARY OF THE DISCLOSURE

The present disclosure addresses the aforementioned drawbacks by providing a hybrid solution including a delay profile calculation algorithm and an efficient hardware beamformer architecture. In some embodiments, systems and methods for ultrafast imaging include: a memory having stored thereon a delay profile matrix and a field programmable gate array (FPGA) coupled with the memory. Each row of the delay profile matrix comprises a delay profile corresponding to a different depth. The FPGA is configured to: acquire radio frequency (RF) ultrasound data from a subject; and load a delay profile from the delay profile matrix to a memory buffer of the FPGA. The delay profile corresponds to a particular depth. The FPGA is further configured to read a first row of the RF ultrasound data based on a first delay value of the delay profile, generate beamformed data at the particular depth by beamforming the first row of RF ultrasound data, and generate an image of the subject based on the beamformed data.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention, however, and reference is therefore made to the claims and herein for interpreting the scope of the invention.

BRIEF DESCRIPTION OF THE DRAWINGS

FIGS. 6A-6F show an example diagram of multiple row simultaneous beamformer for field programmable gate array (FPGA) implementation in accordance with some aspects of the present disclosure. FIG. 6A shows that one row for beamforming is divided into eight clock cycles, FIG. 6B shows that eight delay indexes are read from the delay profile matrix each clock cycle, FIG. 6C shows that eight rows of RF data are read from eight RF data buffers individually, FIG. 6D shows that delay stacked RF data matrices are formed with eight rows of RF data, FIG. 6E shows that partially beamformed rows are formed by diagonally summing of the delay stacked RF data matrices, and FIG. 6F shows that beamformed row is formed by aligning and summing eight partially beamformed rows in accordance with some aspects of the present disclosure.

Figure 8:
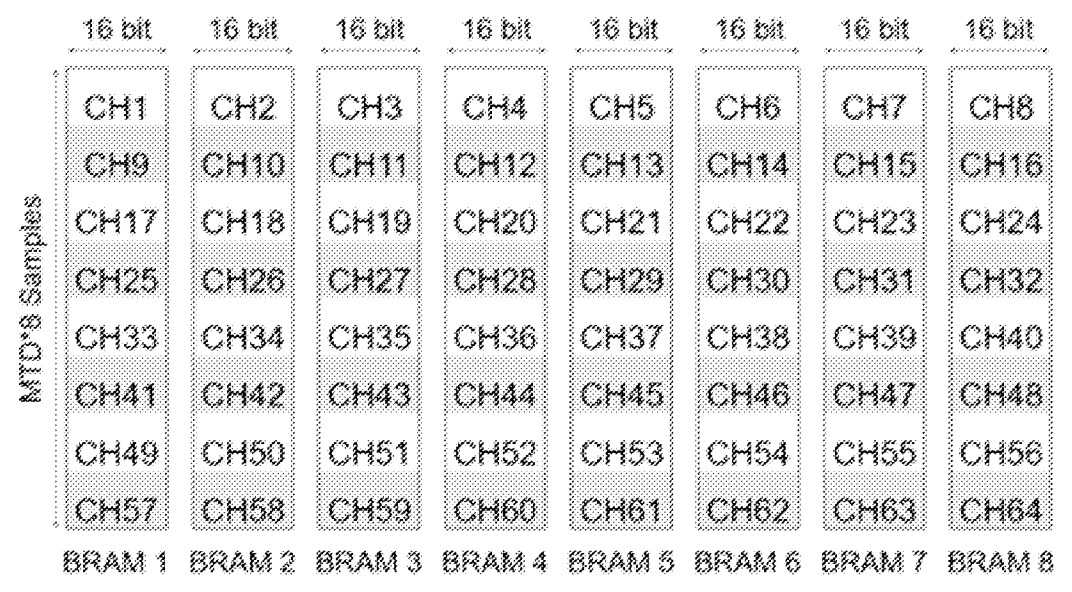

FIG. 8 is an example diagram of a transmit delay compensation implementation in accordance with some aspects of the present disclosure.

FIGS. 9A and 9B show beamformed images of wire targets using an existing beamformer and an example FPGA transformer, respectively. FIG. 9C shows lateral resolution comparison between the existing beamformer and the example FPGA transformer.

DETAILED DESCRIPTION

Described here are systems and methods for continuous ultrafast ultrasound beamforming with programmable logic enabling fast imaging and reducing data storage limitations via an optimized delay profile calculation algorithm and/or a companion beamforming algorithm optimized for field programmable gate array (FPGA) implementation. Further, a parallelized implementation of the beamformer on a single FPGA 1) utilizes a delay compression technique to reduce the delay profile size, which enables both run-time pre-calculated delay profile loading from external memory and delay reuse; 2) vectorizes channel data fetching which is enabled by delay reuse; and 3) uses fixed summing networks to reduce consumption of logic resources.

Advantageously, the systems and methods described in the present disclosure address challenges with conventional ultrasound imaging, including high cost, suboptimal imaging quality, low scan rate, and non-real-time imaging (e.g., low beamforming frame rate of raw imaging data). In particular, the systems and methods are capable of high frame rate (e.g., of over 10,000 frames per second, as compared to less than 5,000 frames per second for conventional techniques). The systems and methods can solve the obstacle of achieving higher beamforming frame rate by enabling delay profile reuse and parallel beamforming. Additionally or alternatively, the systems and methods utilize an FPGA to carry out the beamforming of the raw RF signal conventional techniques, which use a CPU or GPU-based beamformer for processing RF ultrasound signals. In addition, the systems and methods reduce the power consumption and resource requirement due to the highly efficient hardware architecture and allow for continuous recording time for ultrasound localization microscopy (ULM) by saving the beamformed data. In addition, the systems and methods have high scalability that allows fast adaptation to different FPGA resources and beamforming speed demands. Further, the systems and methods allow a compact form factor design by using a single FPGA to complete the beamforming instead of multiple FPGAs.

Example Ultrasound System

Figure 1:
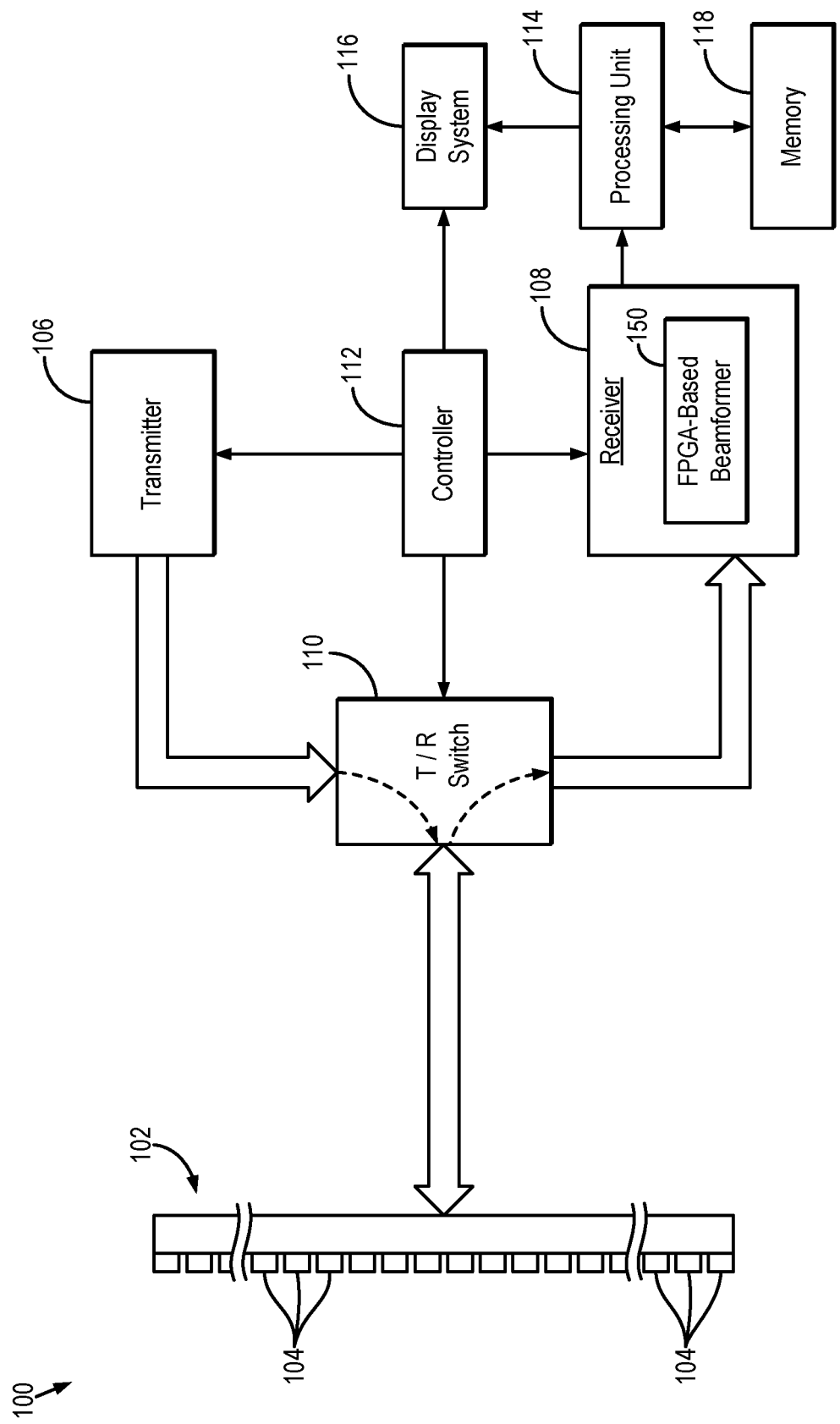
FIG. 1 is a block diagram of an example ultrasound imaging system described in the present disclosure.

FIG. 1 illustrates an example of an ultrasound system 100 that can implement the methods described in the present disclosure. The ultrasound system 100 includes a transducer array 102 that includes a plurality of separately driven transducer elements 104. The transducer array 102 can include any suitable ultrasound transducer array, including linear arrays, curved arrays, phased arrays, and so on. Similarly, the transducer array 102 can include a 1D transducer, a 1.5D transducer, a 1.75D transducer, a 2D transducer, a 3D transducer, and so on.

When energized by a transmitter 106, a given transducer element 104 produces a burst of ultrasonic energy. The ultrasonic energy reflected back to the transducer array 102 (e.g., an echo) from the object or subject under study is converted to an electrical signal (e.g., an echo signal) by each transducer element 104 and can be applied separately to a receiver 108 through a set of switches 110. The transmitter 106, receiver 108, and switches 110 are operated under the control of a controller 112, which may include one or more processors. As one example, the controller 112 can include a computer system.

The transmitter 106 can be programmed to transmit unfocused or focused ultrasound waves. In some configurations, the transmitter 106 can also be programmed to transmit diverged waves, spherical waves, cylindrical waves, plane waves, or combinations thereof. Furthermore, the transmitter 106 can be programmed to transmit spatially or temporally encoded pulses.

The receiver 108 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging. In general, beamforming of the received echo signals is performed in the receiver 108. Thus, in some embodiments, the receiver 108 includes an FPGA-based beamformer 150, such as those described in the present disclosure. In some implementations, the FPGA-based beamformer 150 can include a memory having stored thereon a pre-calculated delay profile matrix, as described in more detail below.

In some configurations, the transmitter 106 and the receiver 108 can be programmed to implement a high frame rate. For instance, a frame rate associated with an acquisition pulse repetition frequency ("PRF") of at least 100 Hz can be implemented. In some configurations, the ultrasound system 100 can sample and store at least one hundred ensembles of echo signals in the temporal direction.

A scan can be performed by setting the switches 110 to their transmit position, thereby directing the transmitter 106 to be turned on momentarily to energize transducer elements 104 during a single transmission event according to a selected imaging sequence. The switches 110 can then be set to their receive position and the subsequent echo signals produced by the transducer elements 104 in response to one or more detected echoes are measured and applied to the receiver 108. The separate echo signals from the transducer elements 104 can be combined in the receiver 108 to produce a single echo signal. For example, the separate echo signals can be beamformed using an FPGA-based beamformer 150 that forms a part of the receiver 108.

The echo signals are communicated to a processing unit 114, which may be implemented by a hardware processor and memory, to process echo signals or images generated from echo signals. As an example, the processing unit 114 can reconstruct images, process reconstructed images, and so on. In some embodiments, the processing unit 114 can include a memory 118 (e.g., secure digital (SD) card or any other suitable computer readable medium) storing a pre-calculated delay profile matrix and/or radio frequency (RF) ultrasound data. In further embodiments, the processing unit 114 can load the delay profile matrix in the memory buffer (e.g., DDR or any other suitable computer readable medium). In some examples, the processing unit 114 can reload the delay profile matrix between two frames of images to adapt the FPGA-based beamformer 150 to different imaging parameters. The processing unit 114 coupled with the FPGA-based beamformer 150 then beamform and write the results back to the memory buffer. After the beamforming, the processing unit 114 can write the beamformed data on the buffer to the memory 118. The beamformed data (i.e., images) produced from the echo signals by the processing unit 114 can be displayed on a display system 116. In some instances, the processing unit 114 and the memory 118 can be included in the FPGA-based beamformer 150 or can be separate units from the FPGA-based beamformer 150.

Example Process

Figure 2:
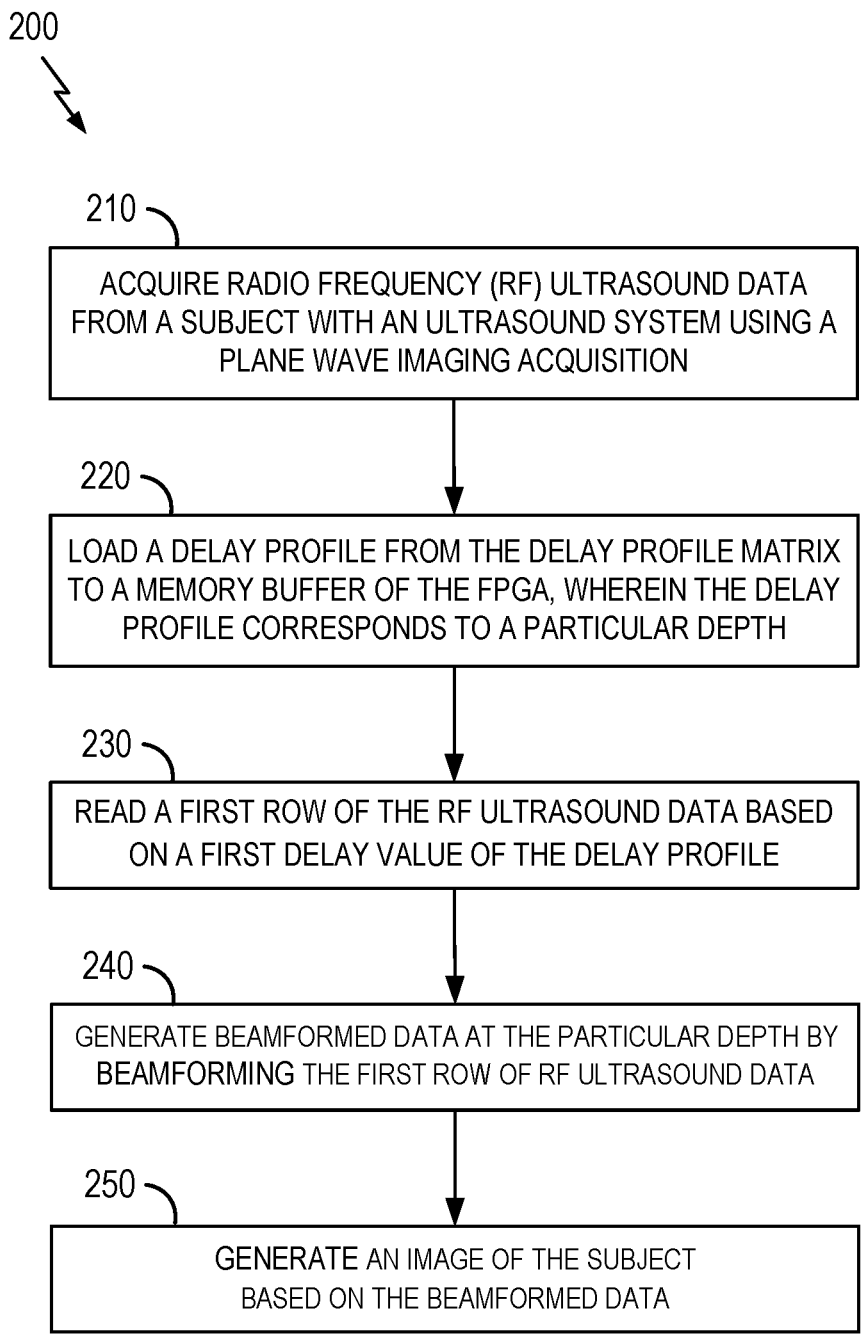
FIG. 2 is a flowchart illustrating an example process for ultrafast ultrasound beamforming in accordance with some aspects of the present disclosure.

FIG. 2 is a flowchart illustrating an example process and technique for ultrafast ultrasound beamforming in accordance with some aspects of the present disclosure. In some aspects of this disclosure, the example process in FIG. 2 can be implemented by or with the ultrasound system 100 illustrated in and described with respect to FIG. 1. As described below, a particular implementation of the ultrasound beamforming may omit some or all illustrated features, and may not require some illustrated features to implement all embodiments. In some examples, any suitable apparatus or means for carrying out the functions or algorithm described below may carry out the process 200. Additionally, although the blocks of the flowchart are presented in a sequential manner, in some examples, one or more of the blocks may be performed in a different order than presented, in parallel with another block, or bypassed.

At block 210, an ultrasound system can acquire radio frequency (RF) ultrasound data from a subject using a plane wave imaging acquisition. In some examples, the subject can include a soft tissue (e.g., muscle, fat, fibrous tissue, blood vessels, or other supporting tissue of the body), a hard tissue (e.g., bones, teeth, etc.), internal organs, or any other suitable structures. In some examples, the ultrasound system can include an integrated circuit (e.g., a field programmable gate array (FPGA)) coupled to a memory. In some examples, the RF ultrasound data can include an electrical signal converted from an echo signal returned by the subject to which one or more ultrasound waves (e.g., a plane waves) have been transmitted by a transducer 102 under the control of a transmitter 106. In further examples, the transmitter 106 may control the transducer 102 to transmit multiple ultrasound waves with different angles for coherently compounding the multiple ultrasound waves to produce high-quality images. In a non-limiting scenario, the RF ultrasound data can include a two-dimensional matrix having a size of D×C, where D is indicative of the total number of samples axially, and C is the total number of elements of the transducer array or the total number of channels. In some examples, the memory can be included in the FPGA or can be a separate device connected to the FPGA. In some scenarios, the memory has stored thereon a delay profile matrix. In further scenarios, the ultrasound system can pre-calculate the delay profile matrix and store the pre-calculated the delay profile in the memory before beamforming the RF ultrasound data. Thus, the ultrasound system 100 does not need to calculate the path delay during the run time.

Figure 3B:
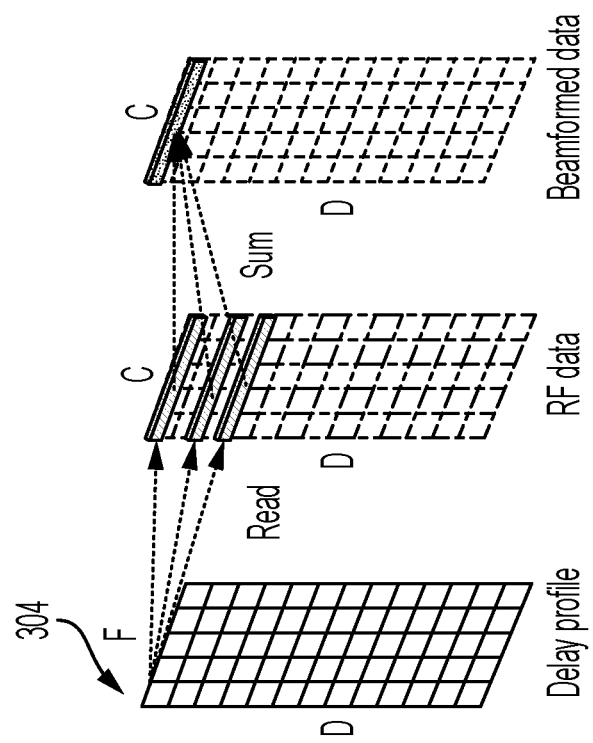
FIG. 3B is a schematic diagram conceptually illustrating an example process to produce beamformed data using an example delay profile matrix in accordance with some aspects of the present disclosure.

In some examples, a delay profile matrix 304 can be a two-dimensional matrix having a size of D×F, where D is indicative of the total number of samples axially, and F is indicative of the fixed sub-aperture size in number of elements as shown in FIG. 3B. In some examples, a single delay value in an element in the delay profile matrix 304 can provide a depth (e.g., a depth address) of the raw RF data given the steering angle (θ), a lateral distance (Δx) between a target and a receive element of the transducer array, and a depth (z) of the target. The delay value can be the same for all the targets or pixels at the same depth. In further examples, the delay value can be used as a pointer to a row of raw RF data. The depth of target is the distance of the real-world target from the probe surface in a unit of millimeter, while the depth of RF data is in the unit of samples which is basically the same meaning as the axial RF sample index. This index can be calculated from the depth of target in such way:

$$\text{index} = \text{round}\left(\frac{2 * \text{target depth} * \text{sampling rate}}{\text{sound speed}}\right).$$

Figure 3A:
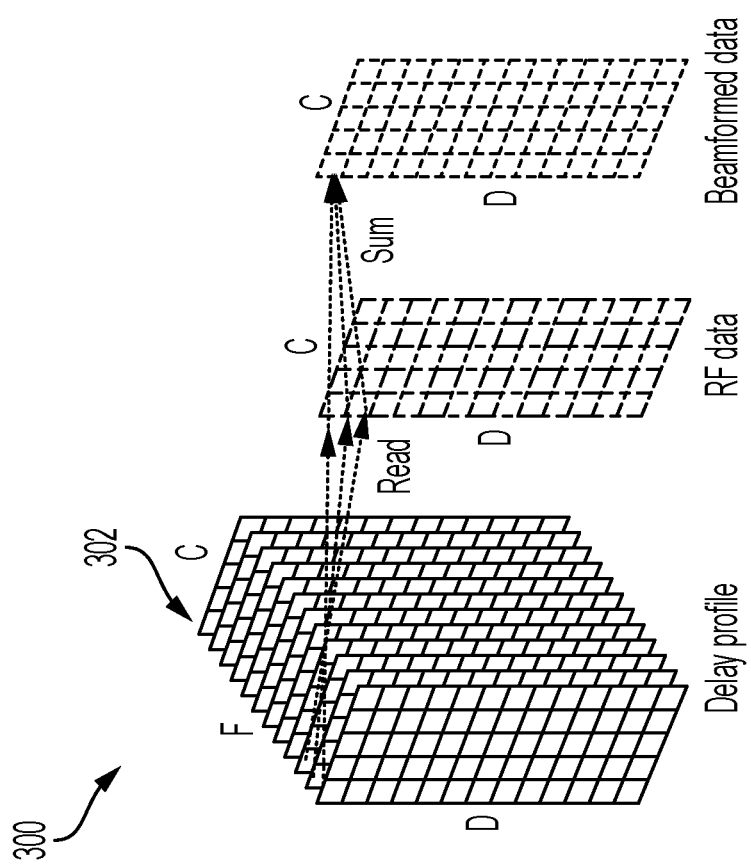
FIG. 3A is a schematic diagram conceptually illustrating an example process to produce beamformed data using a conventional delay profile matrix.

The reason of multiplying by 2 is because the path to receive the echo signal from the target is a round trip. In some examples, a round operation can be used because the index is integer. FIGS. 3A and 3B are schematic diagrams conceptually illustrating an example process 300 to produce beamformed data using a conventional delay profile matrix and an example delay profile matrix that is optimized for reuse, respectively.

Referring to FIG. 3A, conventional techniques use a three-dimensional matrix 302 having a size of D×C×F, where C is the total number of elements of the transducer array. Thus, the conventional techniques use a different delay profile for each beamformed sample. However, as shown in FIG. 3B, the ultrasound system in the present disclosure can use the same delay profile 304 in the two-dimensional matrix for all the beamformed samples at the same depth. Each row of the delay profile matrix 304 can include a delay profile corresponding to a different depth. Thus, the ultrasound system can use the single depth data from a delay profile to read all the RF ultrasound data at the same depth and sum the all the RF ultrasound data to all the beamformed samples at the same depth after left or right shifting.

Figure 4B:
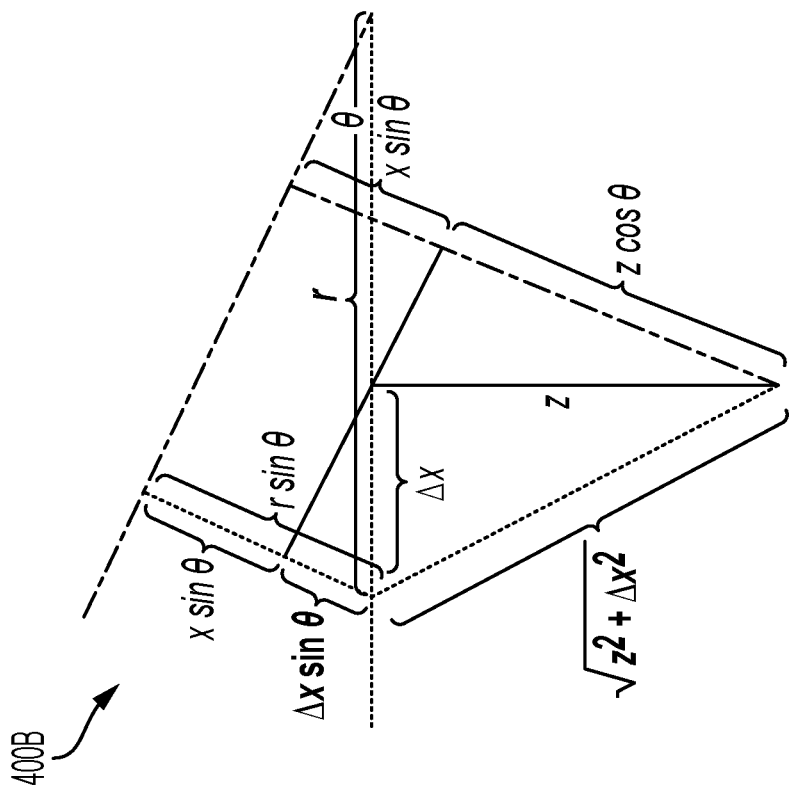
FIG. 4B is a schematic diagram conceptually illustrating a steered path between beamformed point and transducer element accordance with some aspects of the present disclosure.
Figure 4A:
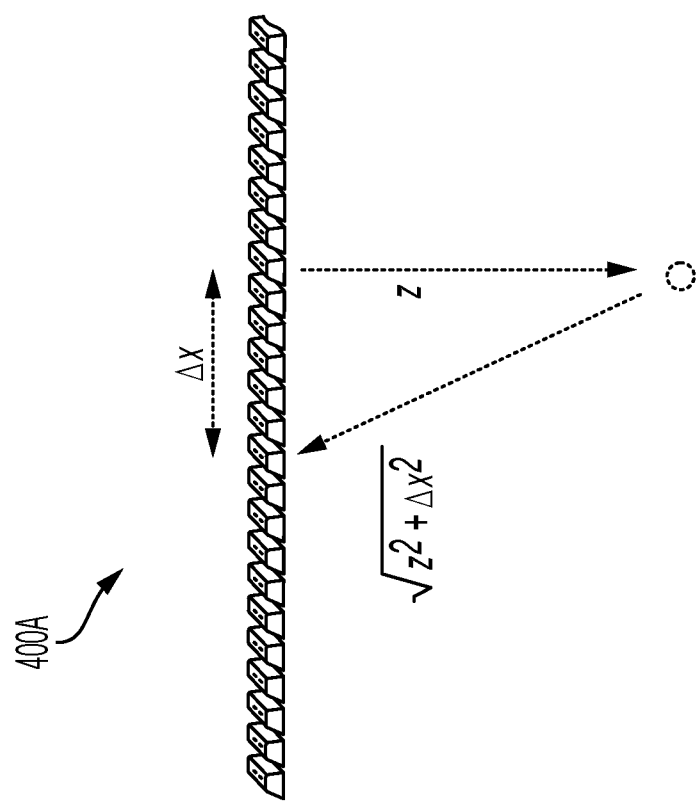
FIG. 4A is a schematic diagram conceptually illustrating an unsteered path between beamformed point and transducer element.

In some embodiments, the ultrasound system can reuse the delay profiles in the delay profile matrix in both unsteered and steered plane wave imaging. Thus, the ultrasound system does not need to rely on the absolute lateral position of the RF sample of the RF ultrasound data in both unsteered and steered plane wave imaging. FIG. 4A is a schematic diagram 400A conceptually illustrating an unsteered path between beamformed point and transducer element. For example, the ultrasound system can calculate a path delay for an unsteered plane wave on transmit to a receive element on the linear array by using the equation: Path=$z+\sqrt{z^2+\Delta x^2}$, where z is the depth of the beamformed sample and Δx is the lateral distance (i.e., Δx=$x_n$−x) between the beamformed sample (i.e., x) and received element (i.e., $x_n$) as shown in FIG. 4A. Thus, the delay is independent of the absolute position of the beamformed sample. In addition, when steering, the ultrasound system can reuse the delay profile for all the samples at the same depth by padding zeros at the beginning of the original RF ultrasound data. FIG. 4B is a schematic diagram 400B conceptually illustrating a steered path between beamformed point and transducer element. For example, the ultrasound system can calculate a path delay for steered plane wave imaging as: Path=$\sqrt{z^2+\Delta x^2}+z*\cos\theta+r*\sin\theta-\Delta x*\sin\theta$, where r or $x_n$ is the absolute lateral position of the receive element (at the index n) with respect to the end of the array and θ is a steering angle of the plane wave as shown in FIG. 4B. Here, the ultrasound system can pad zeros to the original data or remove the beginning RF data samples to remove $r*\sin\theta$ part.

In some examples, the number of zeros padded to the RF ultrasound data can correspond to value of the horizontally flipped $r*\sin\theta$ or $x_n\sin\theta$, which is {(n−1), (n−2), ... 2, 1}*d*sin θ, $x_n$ is (n−1)*d, n is the number of channels or the index of the receive element, and d is the pitch of the array or the element spacing between two elements in the array. The padding zeros at the beginning of each element's RF data with the number of zeros can be calculated from this equation (((n−1)*d−$x_n$)*sin θ*$f_s$), where $f_s$ is the RF sampling frequency, c is sound speed, n is the number of channels or the index of the receive element, and d is the pitch of the array or the element spacing between two elements in the array. The extra delay caused by these padded zeros can be combined with $x_n*\sin\theta$ to form a constant (n−1)*d, where n is the total number of receive elements. Thus, the ultrasound system can calculate a new path delay as: Path=$\sqrt{z^2+\Delta x^2}+z*\cos\theta+(n-1)*d*\sin\theta-\Delta x*\sin\theta$. The total delay can be:

$$\frac{\sqrt{z^2+\Delta x^2}+z*\cos\theta+(n-1)*d*\sin\theta-\Delta x*\sin\theta}{c},$$

where c is the speed of sound. Here, (n−1)*d*sin θ is a constant.

In other examples, the number of RF data sample can be removed. For example, the number of RF data samples to be removed at the beginning of each element's RF data can be calculated from this equation $(((n-1)*d)*\sin\theta*f_s/c)$, where $f_s$ is the RF sampling frequency, c is sound speed, n is the number of channels or the index of the receive element, and d is the pitch of the array or the element spacing between two elements in the array. Thus, the ultrasound system can calculate a new path delay as: Path=$\sqrt{z^2+\Delta x^2}$+z*cos θ−Δx*sin θ. The total delay can be:

$$\frac{\sqrt{z^2+\Delta x^2}+z*\cos\theta-\Delta x*\sin\theta}{c},$$

where c is the speed of sound.

In further examples, the dimensions of the receive delay profile matrix $\tau_{rx}$ can be reduced from three to two by: $\Delta x=x_n-x$, where $x_n$ is a distance from a first element to the receive element, x is a distance from the first element to a target pixel. Δx can represent the relative lateral distance between the pixel and the receive element. The maximum range of Δx is the subaperture size F. Then, the revised receive delay can be rewritten as $$\tau'_{rx}(\Delta x, z) = \frac{\sqrt{z^2+\Delta x^2}}{c}.$$

In this way, the delay profile does not need to be calculated according to both the lateral and axial position of the pixel and the lateral position of the receive element. Instead, the delay profile matrix can be calculated according to the lateral distance between the pixel and the receive element and the axial position of pixel.

In further examples, the transmit delay can be expressed as:

$$\tau'_{tx}(\theta, x_n, \Delta x, z) = \frac{z*\cos\theta+(x_n-\Delta x)*\sin\theta}{c}.$$

To remove $x_n*\sin\theta$ from the transmit delay calculation, the beginning $N_n^{remove}$ samples of RF data can be removed in the receive channel n with the number of removed samples calculated from the transmit delay.

$$N_n^{remove} = \frac{x_n*\sin\theta*f_s}{c},$$

where $f_s$ is the RF sampling frequency, and $x_n=(n-1)*d$. Then, the transmit delay can be rewritten as:

$$\tau''_{tx}(\theta, \Delta x, z) = \frac{z*\cos\theta-\Delta x*\sin\theta}{c},$$

after the removal of the $N_n^{remove}$ samples. In some examples, $x_n$ can be zero, and $x_n*\sin\theta$ can also be zero, which means no sample to be removed. This is because the steering does not add extra delay to the first element. Thus, no extra transmit delay occurs to be removed from the first element. Thus, the ultrasound system can calculate a new path delay as: Path=$\sqrt{z^2+\Delta x^2}$+z*cos θ−Δx*sin θ. The total delay can be:

$$\frac{\sqrt{z^2+\Delta x^2}+z*\cos\theta-\Delta x*\sin\theta}{c},$$

where c is the speed of sound, which is a constant.

Thus, the delay can be dependent only on the steering angle θ, relative lateral distance Δx, and depth z. Based on the delay, a 2D delay profile matrix (D*F) can be calculated for each steering angle instead of a 3D delay profile matrix (D*C*F), where D is indicative of the total number of samples axially, C is the total number of elements of the transducer array, and F is indicative of the fixed sub-aperture size in number of elements. In addition, the improved delay enables all the targets at the same depth to use the same delay profile because there are no absolute positions in the delay profile calculations. Given a fixed steering angle and depth, the only variable is the lateral distance between the target and the receive elements. As a result, all the pixels at the same depth use the same set of delay values. That is, one set of delay values (F delay indexes) can be reused for one pixel to beamform all the pixels at the same depth.

Based on the delay reuse, the ultrasound system can achieve memory parallelization. As all the pixels at the same depth use the same set of delay indexes (F delay indexes), each delay index can be used to read the input RF data samples at the corresponding depth from all the input channels (one row of RF data samples) instead of single input channels (single RF data sample). In this way, the input RF data samples can be vectorized. Each delay index can be used as a pointer to a vector that is $W_i$ elements wide instead of single RF data samples.

Figure 5:
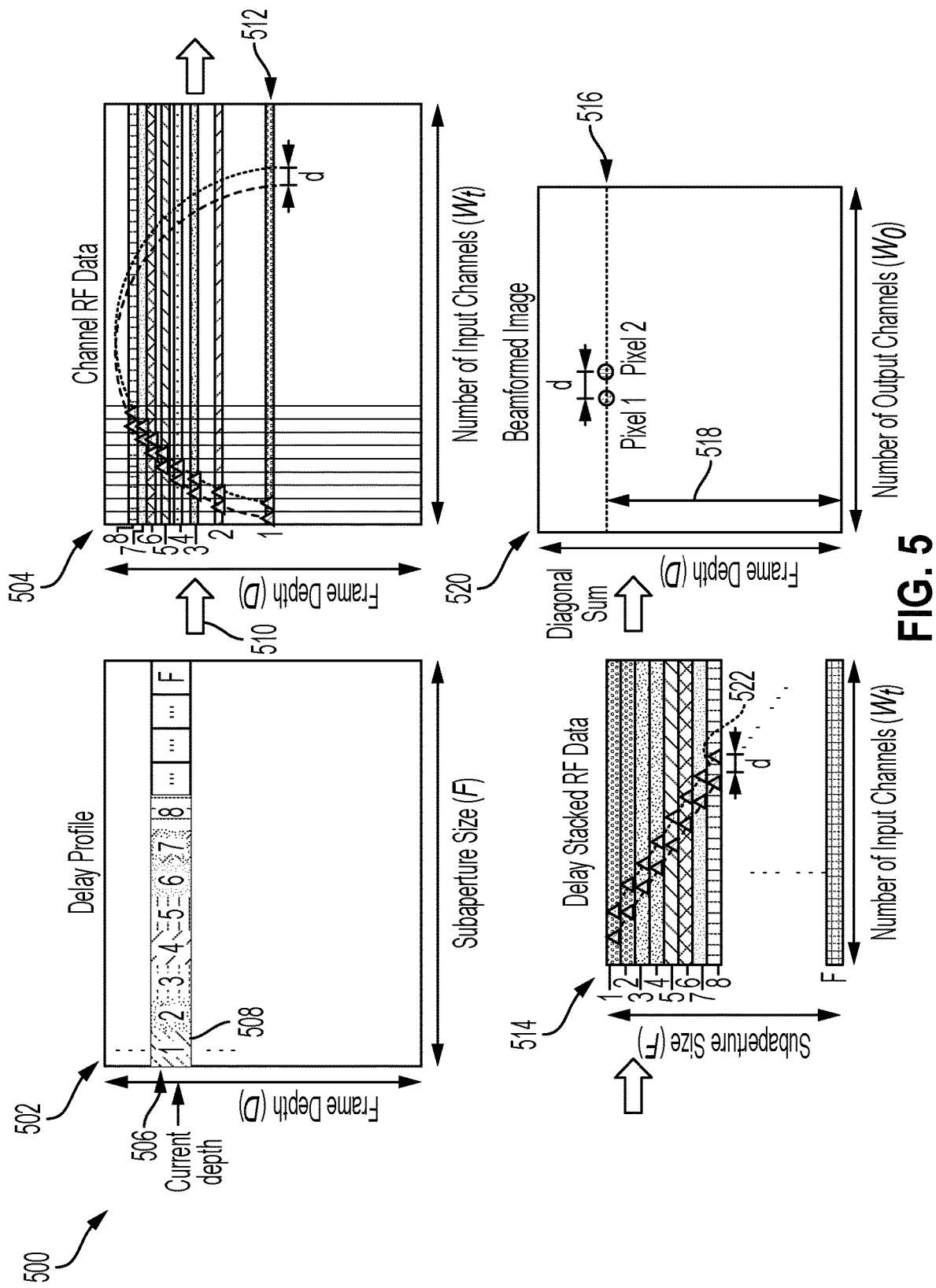
FIG. 5 is an example diagram of parallelized delay and sum (DAS) algorithm in accordance with some aspects of the present disclosure.
Figure 6C:
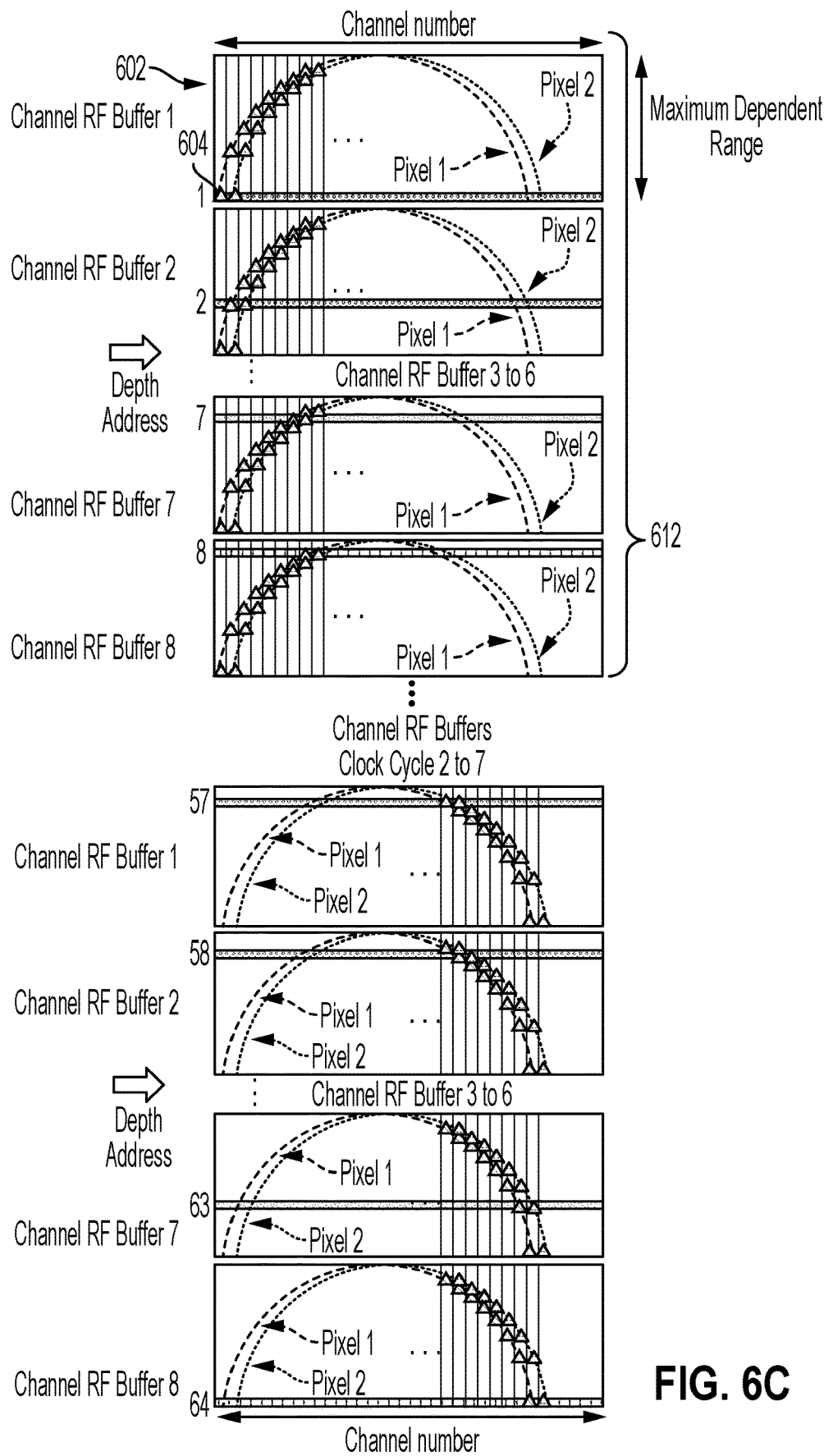
Figure 6D:
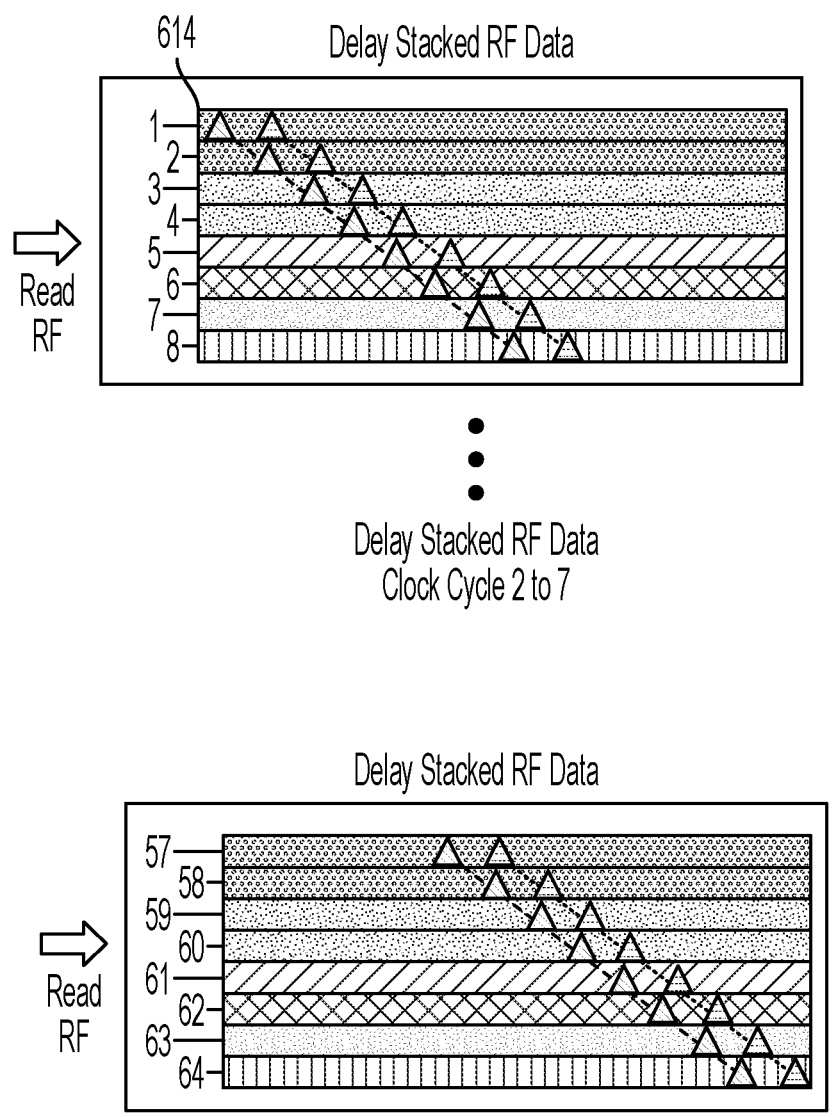
Figures 6E, 6F:
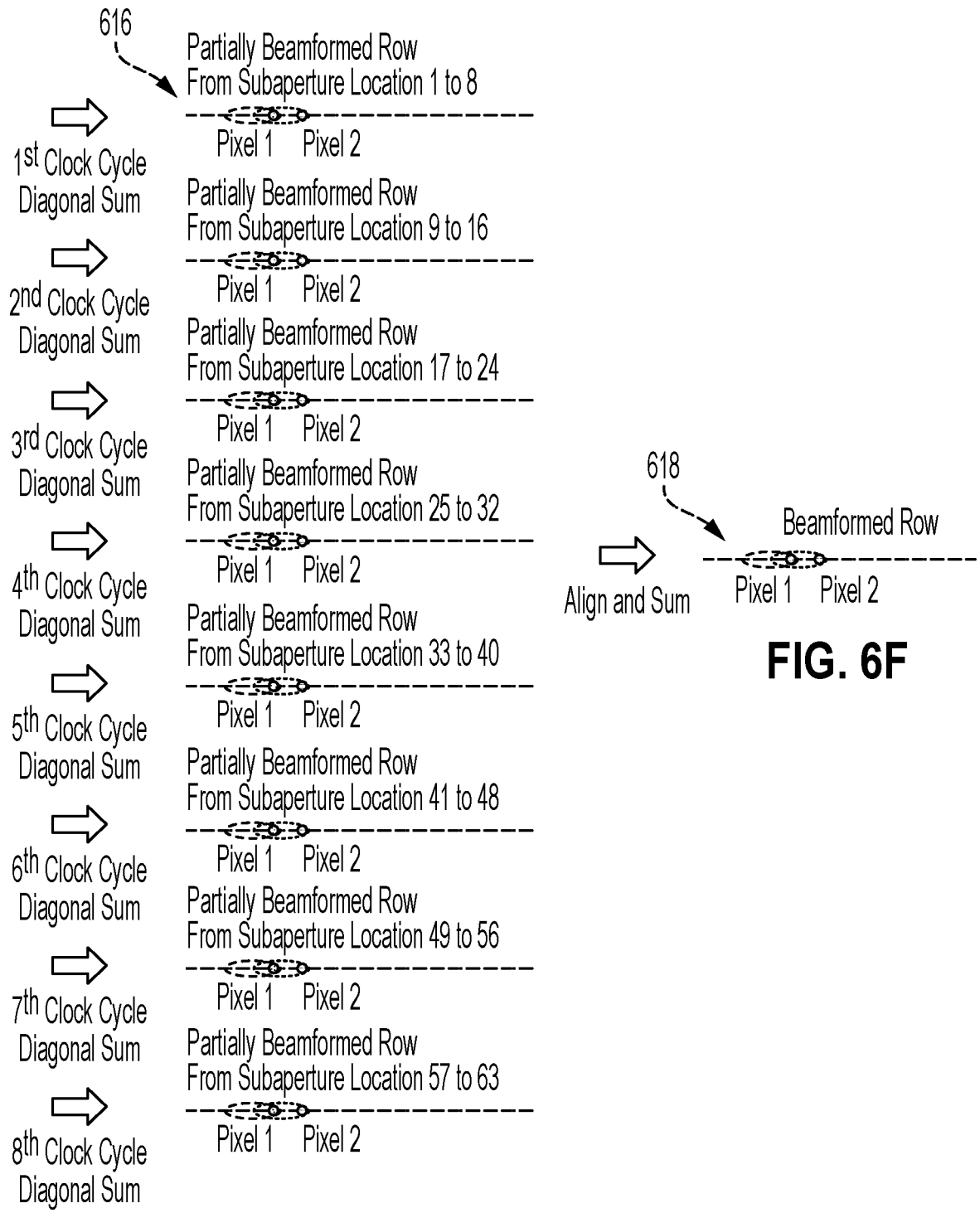

At block 220, the ultrasound system can load a delay profile from the delay profile matrix to a memory buffer of the FPGA. In some examples, the delay profile can correspond to a particular depth in the delay profile matrix. However, it should be appreciated that the ultrasound system can load multiple delay profiles of the delay profile matrix or the whole delay profile matrix to a memory buffer of the FPGA. In further examples, the ultrasound system can load a new delay profile matrix into the memory or a memory buffer between frames of RF ultrasound data to adapt the ultrasound system to different imaging parameters. FIG. 5 shows a delay profile matrix 502 is shown. In some examples, the ultrasound system can read and load the delay profile 506, which is a row in the delay profile matrix at a particular depth. The delay profile 506 can include multiple delay values 508. Given the current depth to beamform all the delay indexes or the delay values 508 at the depth are fetched (F delay indexes).

Referring again to FIG. 2, at block 230, the ultrasound system can read, by the FPGA, a first row of the RF ultrasound data based on a first delay value of the delay profile. In some examples, the first row can correspond to the particular depth of the delay profile. In further examples, the particular depth of the delay profile can correspond to a depth (e.g., a pixel depth index) of beamformed RF ultrasound data. In further examples, the delay profile can include a plurality of delay values, the plurality of delay values corresponding to a plurality of subaperture elements in a transducer array of the ultrasound system. In a non-limiting scenario, a delay value of the delay profile can be the same for all the targets or pixels at the same depth. In FIG. 5, a delay profile matrix 502 includes multiple delay profiles 506 (rows of the delay profile matrix 502). Each delay profile includes multiple delay values 508. In some examples, a delay value 508 of the delay profile 506 can be used as a pointer 510 to the RF ultrasound data 504. In some scenarios, a delay value 508 in the delay profile 506 can point to a row 512 where a position of a RF data sample is. Also, one row 512 of the RF ultrasound data 504 can be read at one time, instead of reading a single RF data sample at one time.

In some embodiments, the ultrasound system can read, by the FPGA, multiple rows 512 of the RF ultrasound data 504 based on the multiple delay values of the delay profile 506. In some examples, each delay value 508 of the delay profile 506 can point to a respective row of the RF ultrasound data 504. Thus, the multiple delay values 508 of the delay profile 506 can point to multiple corresponding rows 512 where positions of the RF data sample in the RF ultrasound data are. In some examples, the ultrasound system can generate multiple memory buffers corresponding to the multiple rows to read multiple rows 512 of the RF ultrasound data in one clock cycle. In further examples, each memory buffer can include a portion of the RF ultrasound data 504. For example, each memory buffer can include the multiple rows. Thus, the multiple rows can be read in one clock cycle.

In further embodiments, the ultrasound system can reduce the size of memory buffers by increasing clock cycles to read the multiple rows of the RF ultrasound data as shown in FIGS. 6A-6F. For example, the ultrasound system can read, by the FPGA, multiple rows 604 of the RF ultrasound data 602 in a predetermined number of clock cycles 606 based on the multiple delay values 610 of the delay profile 608. Thus, the ultrasound system can read a subset of the multiple rows 604 in one clock cycle of the clock cycles 606 based on a subset of the multiple delay values 610 in the delay profile 608. The ultrasound system can read other subsets of the plurality of rows 604 based on other subsets of the multiple delay values 610 in the delay profile 608. In some examples, a subset of the multiple rows 604 can correspond to the total number of the plurality of subaperture elements divided by the predetermined number of clock cycles 606. Multiple subsets of the multiple rows 604 can correspond to multiple subsets of the multiple delay values 610 and the clock cycles 606. In some examples, each delay value 610 in the delay profile 608 can point to a respective row 604 of the RF ultrasound data 602. In some examples, the ultrasound system can generate multiple memory buffers 612. Each memory buffer can correspond to the subset of the plurality of delay values 610. In some examples, each memory buffer 612 can include the multiple rows 604. In some examples, the size of each memory buffer 612 can be defined by a maximum dependent range.

Referring again to FIG. 2, at block 240, the ultrasound system can generate, by the FPGA, beamformed data at the particular depth by beamforming the first row of the RF ultrasound data. In some examples, the ultrasound system can generate beamformed data by beamforming the multiple rows of the RF ultrasound data 504 in connection with FIG. 5. At block 220, the ultrasound system can read multiple rows 512 of the RF ultrasound data based on the multiple delay values of the delay profile 506. Then, the ultrasound system can stack vertically the multiple rows according to a lateral distance between a target of the plurality of rows and a receive element in the transducer array for each of the plurality of rows. In some examples, each row in the vertically stacked rows can have the same distance or pitch (d) between two adjacent input channels in the RIF ultrasound data 504.

For example, after reading the multiple rows, the ultrasound system can stack the multiple rows together following a predetermined order (e.g., ascending order, descending order) of Δx to form a stacked RF data matrix, which is shown on the top right of FIG. 5. As described above, given a fixed steering angle and depth, Δx is the only variable that determines the delay value. Because the matrix is vertically arranged according to Δx, if the increment of both Δx and x are both fixed to d, then the data samples in the first row correspond to location n, and the second row correspond to n+1, and so on. From FIG. 5. after the stacked RF data matrix 514 is formed, all the RF samples inside the subapertures for pixel 1 and pixel 2 are organized in the diagonal direction. In the example of FIG. 5, F rows of the RF data can be stacked in the delay stacked RF data 514. Then, the ultrasound system can sum diagonally the multiple rows to generate a beamformed row 516 of the beamformed data at the particular depth 518. For example, each row of the multiple rows can include multiple RF data samples, which correspond to multiple elements of the transducer array. To sum diagonally the multiple rows, the ultrasound system can sum an RF data sample in a row of the multiple rows corresponding to a first element of the multiple elements and a corresponding RF data sample in another row the multiple rows corresponding to a second element of the multiple elements. In some examples, another row can be adjacent to the row, and the second element can be adjacent to the first element of the transducer array. Thus, the ultrasound system can diagonally sum up the samples in the stacked raw RF data matrix to have all the targets at the same depth beamformed.

In other embodiments, the ultrasound system can generate beamformed data by beamforming the multiple rows of the RF ultrasound data 602 in connection with FIGS. 6A-6F in a different approach than the technique in connection with FIG. 5. At block 220, the ultrasound system can read, by the FPGA, multiple rows 604 of the RF ultrasound data 602 in a predetermined number of clock cycles 606 based on the multiple delay values 610 of the delay profile 608. The ultrasound system can vertically stack the subset of the plurality of rows according to a lateral distance between a target of the subset and a receive element in the transducer array for each of the subset. For example, after reading the multiple rows, the ultrasound system can stack the subset of the multiple rows together following a predetermined order (e.g., ascending order, descending order) of Δx to form a stacked RF data matrix 614, which is shown in FIGS. 6A-6F. The ultrasound system can diagonally sum the subset to generate a partial beamformed row 616 of the beamformed data at the particular depth. Then, the ultrasound system can stack vertically each of the other subsets of the multiple rows. The ultrasound system can diagonally sum each of the other subsets to generate other partial beamformed rows of the beamformed data at the particular depth. The ultrasound system can sum the partial beamformed row and the other partial beamformed rows to generate a beamformed row 618 of the beamformed data at the particular depth. In some examples, the partial beamformed row can include multiple first beamformed RF data samples. Each of the other partial beamformed rows can also include multiple second beamformed RF data samples. To sum the partial beamformed row and the other partial beamformed rows, the ultrasound system can sum the multiple first beamformed RF data samples and the multiple second beamformed RF data samples of each of the other partial beamformed rows to generate a beamformed row of the beamformed data at the particular depth.

Thus, as all the delay indices (F delay indexes) or a subset of the delay indices are read at the same depth, the delay and sum (DAS) parallelization can be achieved. For example as shown in FIG. 5, the ultrasound system can read all delay values 508 (i.e., the delay indices or F delay indexes) in a delay profile 506 (i.e., at the same depth). Then, F rows of the RF ultrasound data 504 (i.e., input RF data samples or F vectors of $W_i$ elements wide) can be read from the channel RF data buffer. After reading F rows 512 of input RF data samples in the memory parallelization, the DAS parallelization can be performed by first stacking F rows of input RF data samples together following the order in the delay profile as shown in the delay stacked RF data 514. Then, the diagonal sum is performed to generate the beamformed result as shown in the beamformed image 520.

In some examples, both the number of beamformed lines and the pitch (d) (e.g., the distance between two adjacent input channels in the RF ultrasound data 504) of the beamformer's output are the same as those of the input ultrasound channels. As a result, $\Delta x$ also has a step size of d. In this way, the lateral spacing of two laterally adjacent delay indices in the delay profile, two adjacent A-lines and two adjacent input channels, can be all d. In some examples, the RF data samples, which are used by the beamforming of one pixel, are aligned as a diagonal line in the delay stacked RF data matrix. This is because both the $\Delta x$ and input channels ($x_n$) have a lateral spacing or step size of d. When both are incremented by the same step size d, the x can remain unchanged (targeting pixel position unchanged) according to the equation, $\Delta x = x_n - x$. This simultaneous increment corresponds to the diagonal direction in the delay stacked RF data 514. For example, in the delay stacked RF data 514, the diagonal line 522 can correspond to all the RF data samples used by the beamforming of one pixel.

In further examples, two adjacent targeting pixels can be beamformed from two adjacent diagonal lines in the delay stacked matrix. This is because when both x and $x_n$ are incremented by the same step size d, $\Delta x$ remains unchanged according to the equation, $\Delta x = x_n - x$, which means two adjacent RF data samples in the same row in the delay stacked RF data 514 individually contribute to two laterally adjacent beamformed pixels in the beamformed image 520. Thus, all the targeting pixels at the same depth can be beamformed by diagonally summing up the delay stacked RF data matrix. For example, Pixel 1 and Pixel 2 in the beamformed image 520 can have a lateral distance of d. The corresponding RF data samples used by the beamforming of these two pixels are two diagonal lines which also have a lateral spacing of d.

In even further examples, fixing both the number and the pitch of the output A-lines from the example beamformer does not necessarily mean the number of output A-lines is the same as that of receive channels, because x can start from $$\frac{d}{2}, \frac{d}{3} \text{ or } \frac{d}{4}$$

and so on. As a result, multiple identical beamformers that are loaded with different delay profile basing on different initial x can be used to reconstruct images with finer spatial pixel resolution.

By performing the memory and DAS parallelization operations, only one row (F delay indexes) can be read from the delay profile matrix and load the corresponding F rows of raw RF data to the stacked RF data matrix to beamform all pixels at the same depth, with all the computation being fully parallel. While due to the FPGA's resource limitation, this fully parallel process can be separated into multiple sequential process which is described above.

At block 250, the ultrasound system can generate an image of the subject based on the beamformed data. For example, the ultrasound system can repeat the process at blocks 230 and 240 for all RF ultrasound data to generate beamformed rows and generate an image of the subject. For example, as the ultrasound system beamforms a row in blocks 230 and 240, the ultrasound system beamforms other rows in the RF ultrasound data. Thus, the ultrasound system can perform the beamforming the RF ultrasound data row by row and generate an image 520 of the subject based on the beamformed rows of the RF ultrasound data as shown in FIG. 5.

Example Implementation

To implement the beamformer on the FPGA, the first step was to perform a linear interpolation by a factor of two on the raw RF data in the fast time direction to improve accuracy of the delay profile. To implement the linear interpolation, a local buffer was used to buffer two consecutive rows of raw RF data from all the input channels. Then, the interpolated row was generated by calculating the mean of these two rows. The output of linear interpolator was reordered to output the interpolated row between two raw RF data rows.

Then, the transmit delay can be compensated for each receive channel according to the equation, $$N_n^{remove} = \frac{x_n * \sin\theta * f_s}{c}.$$

Figure 7:
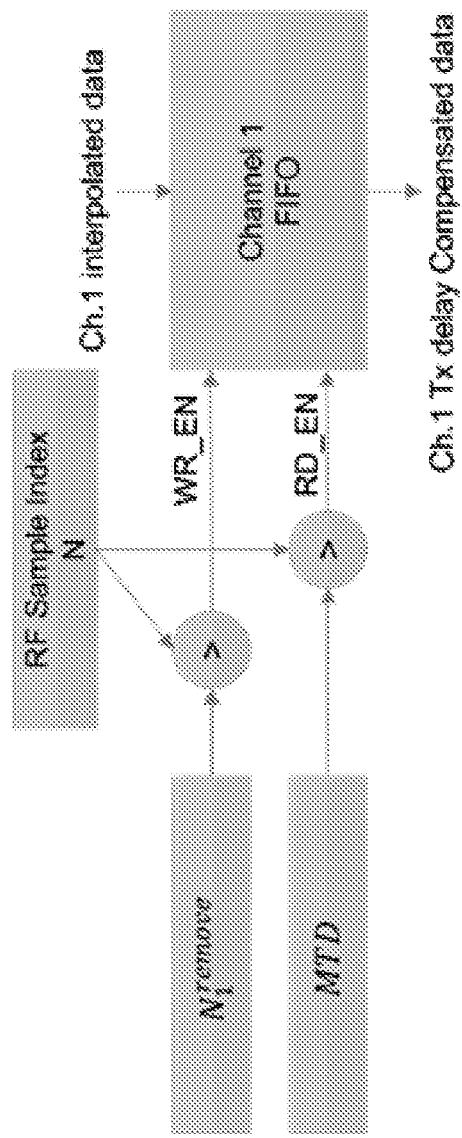
FIG. 7 is an example block diagram of a transmit delay compensation mechanism in accordance with some aspects of the present disclosure.

As the transmit delay was different across all the receive channels, the direct way of implementing the transmit delay compensation was to use W simple-two-port (S2P) block RAM (BRAM) which has one port for read and one port for write. Each BRAM buffers one receive-channel by setting the depth of each BRAM to the maximum transmit delay (MTD) where MTD is the maximum of $N_n^{remove}$ through all the receive channels and steering angles. For each receive channel n, the interpolated RF data were written to the buffer only when N was larger than $N_n^{remove}$, where N was the current RF sample index which is identical to all of the input channels. When N was larger than MTD the interpolated RF data were read from the all the buffers simultaneously. In this way, the beginning $N_n^{remove}$ samples were removed from each channel of the interpolated RF data. FIG. 7 demonstrates this process by showing a block diagram of the example transmit delay compensation mechanism. This diagram shows the transmit delay compensation for input channel 1. All the other input channels have the same structure. The first-in-first-out (FIFO) receives the write enable (WR_EN) signal when current RF sample index N is larger than $N_1^{remove}$ and receives the read enable (RD EN) signal when N is larger than MTD.

As the beamforming process of one row can be separated into multiple clock cycles, which is described herein, only $$\frac{W * F_{sub}}{F}$$

RF samples can be used by the next stage during each clock cycle, where $F_{sub}$ is the number of RF data buffers used. The buffering of receive channel can be reshaped from MTD by W to $$MTD * \frac{F}{F_{sub}} \text{ by } \frac{w * F_{sub}}{F}.$$

For each buffer $$\frac{F}{F_{sub}}$$

pointers were used to track the writing address of each receive channel. In this way, each BRAM handled the transmit delay compensation for $$\frac{F}{F_{sub}}$$

receive channels and only $$\frac{w * F_{sub}}{F}$$

BRAM were used instead of W BRAM. Basically, $$\frac{F}{F_{sub}}$$

time interleaved first input first output (FIFO) was implemented on each of the BRAMs. The total memory space utilized by the transmit delay compensation was still MTD*w*16 bits, but the number of BRAM used was reduced by a factor of $$MTD * \frac{F}{F_{sub}}$$

Though each BRAM was $$\frac{F}{F_{sub}}.$$

in depth instead of MTD, the BRAM can be 1024 or 2048 samples in depth when the width was 16 bits and, in most situations, $$MTD * \frac{F}{F_{sub}}$$

was smaller than the maximum depth of the BRAM. Hence, the total amount of BRAM consumption was reduced by improving the utilization efficiency. An example implementation (W=64, F=32, $F_{sub}$=4) is shown in FIG. 8 by showing a diagram of the example transmit delay compensation implementation with BRAM. This example diagram is drawn with a setting that has W=64, F=32 and $F_{sub}$=4. As a result, only 8 BRAMs each with a depth of MTD*8 instead of 64 BRAMs each with a depth of MTD are used to implement the transmit delay compensation.

The receive delay compensation is a challenging task because the transmit delay is constant for each receive channel given a transmit angle θ, while the receive delay is different at different depths. The major limitation on the hardware implementation of the beamformer to programmable logic is the total internal memory size that is needed to buffer the RF data for receive delay compensation. As described above, multiple rows of RF data can be simultaneously read from the RF data buffers which are implemented by the FPGA's internal memory (e.g., BRAM). If we assume each frame of RF data contains 128 channels (W=128), and each channel has 2,560 samples in depth (D=2560), then each RF buffer's data size is 5 Mb if the quantization depth is 16 bits (e.g., 128×2,560×16 bits=5 Mb). If the subaperture size is 64 (F=64), and the beamforming is finished in one clock cycle, then 64 RF buffers can be used to read 64 rows of RF data simultaneously assuming each RF buffer provides a single read port (only one row could be read every clock cycle). The total memory size could reach 320 Mb (e.g., 5 Mb×64=320 Mb), which is much larger than the capacity of most current FPGAs.

To address this challenge and make the implementation practical, two strategies were utilized. First, instead of buffering the whole frame of RF data to the internal buffer, only a portion of the RF data was buffered, because each row of the beamformed sample only used RF data over a limited range of depth, which was defined as dependent range (DR), and the largest DR in all the rows of one frame was defined as maximum dependent range (MDR). MDR was much smaller than the total depth of one frame.

If the subaperture size (F) is fixed, the DR is larger for shallower regions than that for deeper regions where the delay profile is flatter, which is described by the derivative of $\tau_{total}(\theta, \Delta x, z)$ with respect to $\Delta x$, $$\frac{\partial \tau_{total}(\theta, \Delta x, z)}{\partial \Delta x} = \frac{\Delta x}{c * \sqrt{\Delta x^2 + z^2}} - \frac{\sin \theta}{c}.$$

To further reduce MDR and save internal memory resources, the subaperture size was reduced for the shallower regions (close to the probe surface) in a fixed F-number way to maintain a homogenous lateral resolution.

As only a portion of the RF data were used for the beamforming of each row of image, the size of the RF buffer could be reduced from the total depth to MDR by using cyclic buffers. To be specific, a modulo operator with divisor equal to MDR was added to the address port of RF data buffers.

As a result, the buffer depth, which is the same as MDR, was reduced from 2,560 samples to 150 samples with a Verasonics L35-16vX probe and a fixed F-number of unity. Under this condition, the size of each RF buffer was reduced to 300 Kb (128×150×16 bits=300 Kb).

Second, instead of using subaperture size number of RF buffers, fewer RF buffers ($F_{sub} \leq F$) were used, and the beamforming of one row was separated to multiple clock cycles, which is equal to $$\frac{F}{F_{sub}}.$$

In each clock cycle, only $F_{sub}$ channels of the subaperture were beamformed. Referring again to FIGS. 6A-6F, Phase (a) in FIG. 6A shows the case of $F_{sub}$=8. Eight RF data depth indices are read during each clock cycle from the delay profile matrix, as shown in Phase (b) in FIG. 6B. Only eight rows of RF data need to be read each clock cycle. As RF data buffers were configured as one port for read and one port for write, eight RF buffers were needed, as shown in Phase (c) in FIG. 6C. The total RF buffer size was reduced to 2,400 Kb (8×300 Kb=2400 Kb), which was less than 1% of storage consumption for the unoptimized case and was an acceptable value for practical FPGA implementation. Then, the delay stacked RF data matrix was formed based on eight rows of RF data, as shown in Phase (d) in FIG. 6D. The partial beamformed row from eight rows of RF data is shown in Phase (e) in FIG. 6E. Next, the partial beamformed rows from eight clock cycles were aligned and summed up to form the beamformed row, as shown in Phase (f) in FIG. 6F. It generates the same results described above in connection with blocks 230 and 240 in FIG. 2, where one row is beamformed in one clock cycle, but with fewer resources demanded by increasing the overall processing time.

As a result, the beamforming of one row in only eight clock cycles can be performed as the subaperture size is fixed at 64 elements. The beamforming time of one frame is 2,560*8=20,480 clock cycles. The RF data input and beamformed data output occur simultaneous to the beamforming process because the whole process is pipelined.

As described above, the implementation of the example beamformer is parameterized by several key variables, such as W, F and $F_{sub}$. In some examples, the number of output A-lines $W_o$ is the same as the number of elements $W_i$ and use W to represent both parameters to simplify the discussion. To have finer lateral grid on the output beamformed image, multiple identical beamformers with different delay profiles that are used could be implemented. The number of identical beamformers that are implemented is defined as R. With the introduction of R, the number of output A-lines $W_o$ is redefined as $W_i*R$.

By tuning these four parameters ($W_i$, F, $F_{sub}$ and R), we can generate different FPGA implementations to adapt to different beamforming speeds and FPGA resource requirements by a single click inside a synthesis tool without manually rewriting the code. Four different settings were tested where the setting are listed in Table I, to adapt to different FPGA models and beamforming parameters. Setting 1 is appropriate for handheld ultrasound with strict power limitations. Setting 2 is appropriate for general ultrafast ultrasound imaging. Settings 3 and 4 are appropriate for high-end ultrafast ultrasound imaging with either extreme frame rate or higher lateral resolution needs.

TABLE I

Design scaling settings

| Setting | Device | $W_i$ | F | $F_{sub}$ | R |
|---|---|---|---|---|---|
| 1 | ZUSEV | 64 | 32 | 4 | 1 |
| 2 | ZU9EG | 128 | 64 | 8 | 1 |
| 3 | KU19P | 128 | 64 | 16 | 1 |
| 4 | KU19P | 128 | 64 | 8 | 2 |

In the example design, the beamformer was packaged as an Intellectual Property (IP) core which was automatically generated by the Xilinx Vitis™ HLS to be easily migrated. The AXI4 interface was chosen to be the data input and output port of the IP. The AXI4 interface is a memory mapped interface, which can be connected to the DDR memory to read the raw RF data from the DDR memory and write the beamformed results back to the DDR memory. Each AXI4 port could provide up to 156 Gbps bandwidth when it is connected to a 64-bit 2400 MHz DDR4 memory. The DDR memory can be operated as a large data buffer to amend the gap between the peak data rate of input data, which can be as large as 112 Gbps for a 128 channel system with 14-bit, 62.5 MHz ADC and the sustainable average beamforming rate of the beamformer. After loading the data from the external DDR through the AXI4 interface, the data were loaded to the internal BRAMs by the beamformer.

Experiment and Results

Design realization: For an example experiment, the example method and system disclosed herein was written by C++ and synthesized to Verilog by Xilinx Vitis™ High-Level Synthesis (HLS 2022.2). Xilinx pragmas were used to instruct HLS to apply the parallelization to the C++ code. This workflow enabled fast implementation and verification of the example FPGA design. The synthesized results were then implemented by Xilinx Vivado® ML edition 2022.2.

Data sets: In the experiment, the raw RF channel data recorded from different arrays connected to a Verasonics Vantage system was used as data input to the beamformer. The beamformed IQ data from the Verasonics and the resulting images were compared to the results obtained using the example beamformer described in this disclosure.

A tissue-mimicking phantom (CIRS 040GSE) was scanned with a Verasonics L11-5v probe to evaluate lateral resolution and contrast. In this set, the imaging was performed using plane-wave compounding with steering angles from −18° to 18° with a step size of 6°. A transmit frequency of 7.8 MHz and an RF sampling rate at 31.25 MHz were used in this scan.

As a second test, a mouse brain was scanned with a Verasonics L35-16vX probe. The mouse was injected with microbubbles (Definity®) to conduct super-resolution ULM of the mouse brain and to evaluate the speed of our beamformer. The mouse was anesthetized by 4% isoflurane mixed with the medical oxygen in a gas induction chamber. The mouse was then transferred to the customized imaging stage and the mouse head was fixed to the stereotaxic frame with ear bars. Furthermore, the anesthesia was maintained by supplying the 2% isoflurane with oxygen through a nose cone. The scalp was removed and both side of the skull between Bregma and Lambda was opened using a rotary Dremel® tool to expose the brain. The ultrasound transducer was placed above the cranial window with a coupling gel to image in the coronal plane. A 30-gauge catheter was cannulated through the tail vein. Then, the microbubbles, 6×10⁸, were continuously infused using a programmable syringe pump (New Era Pump Systems Model 1000) at a flow rate of 10 μL/min. Ultrasound imaging was performed using nine steering angles (−4° to 4° in 1° step size) with a post-compounding frame rate of 1,000 Hz. A total of 39 sets of 1,600 frames were acquired. Data in each acquisition had 1,280 samples in the axial dimension. A transmit frequency at 20 MHz and an RF sampling rate at 125 MHz were used in this scan.

The RF data and pre-calculated delay profile were then imported to Xilinx HLS C/RTL co-simulation to get the beamformed results.

Latency and resources utilization results: The latency of beamforming one frame with 1,280 samples (pre-interpolation raw RF samples) in fast time direction without delay profile loading time is listed in Table II. The maximum operating frequency based on the implementation results is also listed in Table II, along with the corresponding frame rate at this frequency. The number of clock cycles used to beamform one image with $F_{sub}$=8 in setting 3, which was the same as the example situation described above, was 20,503 clock cycles. The extra 23 clock cycles were from the pipeline delay. The delay profile only needed to be loaded once before the beamforming process, as we kept the same parameters for the whole process. Therefore, the delay profile loading time would not slow down the beamformer frame rate.

TABLE II

Latency and frame rate

| Setting | Device | Latency | Clock Frequency | Frame Rate | Input Rate |
|---|---|---|---|---|---|
| 1 | ZUSEV | 20,500 | 314.26 MHz | 15,330 | 1.26 GSPS |
| 2 | ZU9EG | 20,503 | 304.79 MHz | 14,865 | 2.44 GSPS |
| 3 | KU19P | 10,259 | 302.30 MHz | 29,466 | 4.83 GSPS |
| 4 | KU19P | 20,501 | 302.76 MHz | 14,768 | 2.42 GSPS |

According to Table II, the highest sustainable average input rate among the four settings is 4.83 GSPS ($W_i*D*FPS=128*1280*29466=4.83$ GSPS), which needs the DDR memory to provide an external memory bandwidth of 77.28 Gbps (4.83 GSPS*16 bits). A 64-bit 2400 MHz DDR4 memory could provide 153.6 Gbps (2400 MHz*64 bits) memory bandwidth, which is enough to support the beamformer input rate.

The post-implementation hardware resource utilization and power consumption estimation from Vivado® is listed in Table III.

TABLE III

Resource utilization and power consumption

| Setting | Device | LUT | BRAM | Total on-chip power |
|---|---|---|---|---|
| 1 | ZUSEV | 16,043 | 67 | 2.066 W |
| 2 | ZU9EG | 41,428 | 318 | 5.385 W |
| 3 | KU19P | 57,340 | 491 | 12.968 W |
| 4 | KU19P | 73,843 | 478 | 12.173 W |

According to our measurement, the Verasonics beamformer (Intel Xeon® W-2155 10 cores 20 threads 3.3 GHz 64 GB RAM) achieved a frame rate of 406 fps on the same data set as setting 2 used. The example FPGA beamformer could speed up the beamforming by a factor of 36.6 under setting 2 and 72.6 under setting 3.

Beamformed image comparison: The beamformed images from the CIRS phantom using the example FPGA beamformer are shown in FIGS. 9 and 10. The Verasonics beamformed image of wire targets is shown in FIG. 9A and the FPGA beamformed image is shown in FIG. 9B. Visually, no lateral resolution degradation of the FPGA beamformed image compared to Verasonics beamformed image was observed. The lateral resolution comparison of Verasonics 902 and FPGA beamformer 904 results is shown in FIG. 9C.

Figures 10A, 10B:
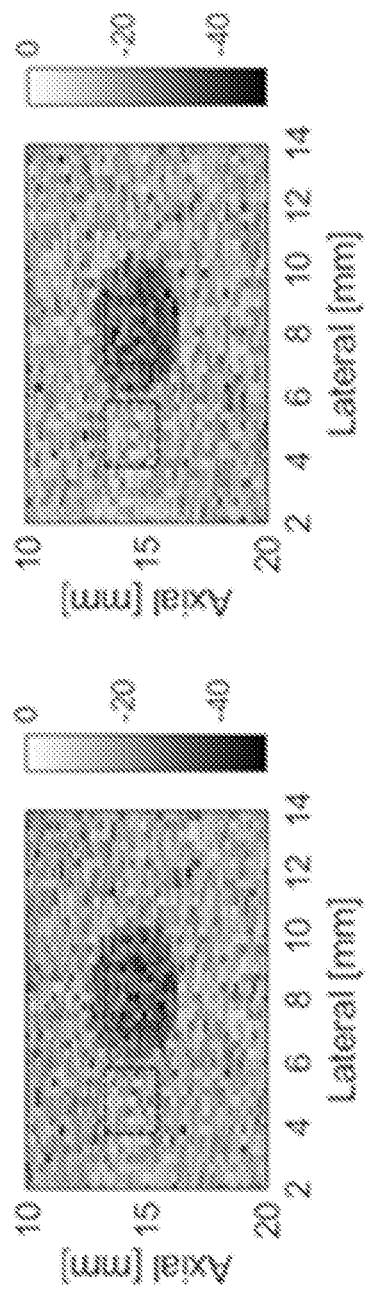
FIGS. 10A and 10B show beamformed images of an anechoic target using an existing beamformer and an example FPGA transformer, respectively.

Images of an anechoic target inside the CIRS phantom were constructed using the Verasonics and the FPGA beamformer. Visually, no differences were observed between the Verasonics beamformed images and FPGA beamformed images in FIGS. 10A and 10B. FIGS. 10A and 10B show beamformed images of an anechoic target using an existing beamformer and an example FPGA transformer, respectively. The contrast to noise ratio (CNR) was calculated to compare the performance. The CNR is given by $$CNR = \frac{|u_i - u_o|}{\sqrt{\sigma_i^2 + \sigma_o^2}},$$

where $u_i$ and $u_o$ represent the mean pixel intensity inside and outside the anechoic cyst; and $\sigma_i^2$ and $\sigma_o^2$ denote the variance of pixel intensity inside and outside the anechoic cyst. The CNR values from the Verasonics beamformer and FPGA beamformer were both 1.0.

Power Doppler images of a mouse brain were created by the accumulation of SVD (Singular Value Decomposition) filtered 1,600 post-compounding frames. The images based on Verasonics beamformer and the example method disclosed herein have visually comparable results in the spatial resolution of vessels. The only noticeable difference is some parts of the image results from FPGA beamformer is slightly darker than that from the Verasonics beamformer. The reason behind this is the subaperture size is smaller for the parts of image results from the FPGA beamformer, which is described above.

Figure 11:
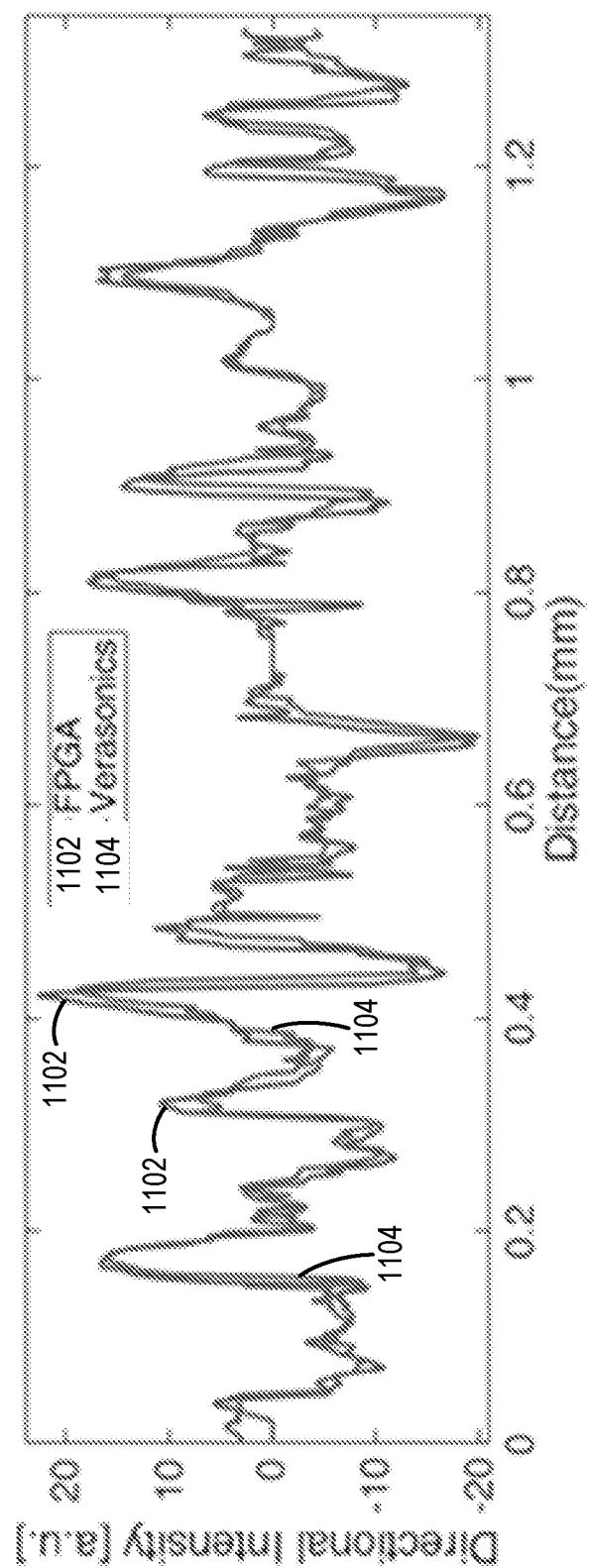
FIG. 11 shows cross-section comparison of directional flow images with an existing beamformer and an example FPGA transformer.

ULM images of a mouse brain were generated by 39 sets of data described above. In the ULM processing, the MB signal with different speed ranges and directions were separated into three groups using 3D Fourier domain filters and processed separately. Velocity maps were generated using a bipartite graph-based MB pairing and tracking algorithm. The final localization and velocity images were the combination of the individual reconstruction images generated from each acquisition. The cross-section comparison between the directional flow images with Verasonics 1104 and FPGA beamformer 1102 is shown in FIG. 11. No visually apparent difference can be identified from the ULM images constructed from Verasonics beamformer 1104 and FPGA beamformer 1102. The cross-section comparison between the two beamformers also shows the similarities between the results of two beamformers.

Further Examples

The example beamforming parallelization method disclosed herein can integrate with hardware (programmable logic implementation on an FPGA) to achieve ultrafast beamforming for ultrafast ultrasound imaging. The method solves the major obstacle of achieving higher beamforming frame rate by enabling delay profile reuse and parallel beamforming. HLS based design flow also enables fast adaption to different applications and platforms. A sustainable average beamforming rate of 4.83 GSPS in terms of input raw RF samples or 29,466 FPS in term of frame rate was achieved by the example ultrasound PWI beamformer.

The image quality of the example FPGA beamformer disclosed herein was similar to that of Verasonics beamformer as quantified by the CNR and lateral resolution in the phantom experiments. This indicates that the example FPGA beamformer did not sacrifice the quality of the image for speed. The performance of the FPGA beamformer with in vivo data was also assessed by imaging a mouse brain injected with microbubbles. Power Doppler images and ULM images created with the FPGA beamformer were compared with images created using the Verasonics beamformer side-by-side. Cross-section plots of the ULM images were also provided to directly compare the performance. The correctness and quality of the example beamformer was verified by the visual similarities between the results from the example method and the Verasonics beamformer.

The importance of the example method includes potentially enabling continuous unblocked ultrafast ultrasound imaging. This is possible because the example beamformer can be easily integrated to FPGAs that can be directly connected to AFEs without the need of PCI-Express interface and host computer in between. The bandwidth of data being transferred to a host PC could be reduced to a much lower value that could match the speed for saving to a hard drive by adding compounding and IQ demodulation to the beamformer. In this way, long duration, continuous ultrafast ultrasound can be achieved with the example beamformer. With continuous unblocked ultrafast ultrasound, ULM could be improved by having a larger number of frames in one data set and much longer tracking duration compared to current ultrasound research platforms. Functional ultrasound (FUS) could also be improved by having continuous real-time ultrafast ultrasound imaging. Furthermore, other time-consuming workload computations traditionally done on a CPU or GPU, such as compounding, IQ demodulation and high pass filtering, can be moved to an FPGA to enable faster frame rates and real-time processing.

Using the Xilinx HLS toolchain, the example beamformer design can be easily scaled up or scaled down to fit different platforms and applications in a short time by simply modifying several parameters.

The example parallelization method disclosed herein improved the memory utilization efficiency and simplified the memory architecture by delay profile reuse. All the summing operations in the example design disclosed herein were performed with LUT instead of DSP cores to save DSP resources for other operations that needed multiply operations and to lower the power consumption. As a result, the low power consumption feature of the example FPGA-based beamformer makes ultrafast ultrasound imaging possible on portable devices by reducing the beamformer power consumption to about two watts. Dynamic apodization, which can efficiently reduce sidelobes, is a feature that has not been considered in the example method. It is a tradeoff between the resource utilization and the sidelobe level we chose. The dynamic apodization needs DSPs to perform multiplications, companion LUTs and memory resources to load and buffer the apodization coefficient, and an increase in power consumption due to more resource utilization. A preliminary experimental implementation with setting 2, plus dynamic apodization, resulted in a 70% increase in the number of LUTs and 40% increase in power consumption along with utilization of over 900 DSPs.

In some examples, compounding and digital down conversion can be implemented by accumulating the beamformed results on a frame buffer using internal Xilinx Ultra RAM (URAM) which has larger size than BRAM. Then, the digital down convertor can be generated by traditional DSP design tools such as Xilinx System Generator and imported to HLS using the generated RTL code.

A comparison of this work with previous FPGA-based beamformers is shown in Table IV. The resource utilizations of previous works have been converted to the same standard for easy comparison. One thing to notice is that the previous works are all complete real-time ultrasound scanning systems, which includes more processing and control in the FPGA that consumes more FPGA resources than the example design, which is currently limited to simulation. As a result, the resource utilization in Table IV only serves as a reference instead of a fair comparison.

TABLE IV

Comparison with previous work. Schemes 1-4 represent the example beamformer and the last two rows are comparison beamformer schemes.

| Scheme | Subaperture Size | RF Frame Size | Frame Rate | LUT | BRAM (blocks) | DSP (slices) |
| --- | --- | --- | --- | --- | --- | --- |
| 1 | 32 | 1,280 * 64 | 15,330 | 16,043 | 67 | 0 |
| 2 | 64 | 1,280 * 128 | 14,865 | 41,428 | 318 | 0 |
| 3 | 64 | 1,280 * 128 | 29,466 | 57,340 | 491 | 0 |
| 4 | 64 | 1,280 * 128 | 14,768 | 73,843 | 478 | 0 |
| Previous work 1 | 32 | 1,280 * 96 | 3,800 | 144,800 * 4 | 1,087 * 4 | 322 * 4 |
| Previous work 2 | 8 (per FPGA) | 1,024 * 64 | 14,000 | 67,375 * 8 | 242 * 8 | 492 * 8 |

Also, the example methods were designed specifically for ultrafast plane wave imaging. So, this can achieve higher beamforming rates within a compact design. However, in terms of performance or speed, the example design provides the highest beamforming rate because of delay profile reuse, which eliminates the run-time delay profile calculation and simplifies the memory reading architecture.

The example design can be integrated to an ultrasound scanning system for real-time online demonstration with a customized ultrasound scanning system that connects all the AFEs to a single FPGA. This is feasible with newest AFE and FPGA technologies that use JESD204B interface to replace traditional LVDS interface which can greatly ease the pin counts limitation and printed circuit board layout challenges. The physical interface part can be built to demonstrate that 16 channels of ultrasound data can be transferred to a single FPGA via only two lanes of JESD204B interfaces. Xilinx JESD204B IP was used in this to convert the high-speed serial interface from the AFE to a parallel interface. Current Xilinx FPGA such as Virtex™ Ultrascale™ provides the capabilities of connecting up to 128 lanes of JESD204B interfaces to a single FPGA, which means up to 1024 ultrasound channels can be connected to a single FPGA. This is far above the channel counts (128 or 256) of common linear array used by ultrafast ultrasound imaging. For a channel count higher than 128, multiple DDR4 memory or high bandwidth memory (HBM) can be used to provide an adequate memory bandwidth for both the ADC data and the beamformed data.

CONCLUSION

The example FPGA implementation of an ultrafast beamformer enabled steered PWI with high verspropatility and scalability. Due to the versatility of the implementation, there is no need to regenerate the bitstream or reprogram the FPGA to adapt to different probes or steering angles. The HLS allows changing the scale of FPGA beamformer to fit different application scenarios in a very short turnaround. This architecture can be utilized in both high-end ultrasound research platforms that need a frame rate of over 29,000 FPS or for portable pocket ultrasound scanners that need a high efficiency, low power compact FPGA beamformer.

The invention claimed is:

1. A method for ultrafast ultrasound imaging comprising:
   acquiring radio frequency (RF) ultrasound data from a subject with an ultrasound system using a plane wave imaging acquisition, the ultrasound system including a field programmable gate array (FPGA) coupled to a memory, wherein the memory has stored thereon a delay profile matrix, wherein each row of the delay profile matrix comprises a delay profile corresponding to a different depth;
   loading a delay profile from the delay profile matrix to a memory buffer of the FPGA, wherein the delay profile corresponds to a particular depth;
   reading, by the FPGA, a first row of the RF ultrasound data based on a first delay value of the delay profile;
   generating, by the FPGA, beamformed data at the particular depth by beamforming the first row of RF ultrasound data; and
   generating an image of the subject based on the beamformed data.

2. The method of claim 1, wherein the first row corresponds to the particular depth.

3. The method of claim 1, wherein the delay profile comprises a plurality of delay values, the plurality of delay values corresponding to a plurality of subaperture elements in a transducer array of the ultrasound system.

4. The method of claim 3, wherein reading the first row comprises:
   reading, by the FPGA, a plurality of rows of the RF ultrasound data based on the plurality of delay values, the plurality of rows including the first row, and
   wherein each delay value of the plurality of delay values points to a respective row of the plurality of rows of the RF ultrasound data.

5. The method of claim 4, further comprising:
   generating a plurality of memory buffers corresponding to the plurality of rows, each memory buffer of the plurality of memory buffers comprising the plurality of rows.

6. The method of claim 5, wherein the plurality of rows is read in one clock cycle.

7. The method of claim 4, further comprising:
   vertically stacking the plurality of rows according to a lateral distance between a target of the plurality of rows and a receive element in the transducer array for each of the plurality of rows; and
   diagonally summing the plurality of rows to generate a beamformed row of the beamformed data at the particular depth.

8. The method of claim 7, wherein each row of the plurality of rows comprises a plurality of RF data samples, the plurality of RF data samples corresponding to a plurality of elements of the transducer array,
   wherein diagonally summing the plurality of rows comprises:
   summing an RF data sample in a row of the plurality of rows corresponding to a first element of the plurality of elements and a corresponding RF data sample in another row the plurality of rows corresponding to a second element of the plurality of elements, the another row being adjacent to the row, the second element being adjacent to the first element.

9. The method of claim 3, wherein reading the first row comprises:
   reading, by the FPGA, a plurality of rows of the RF ultrasound data in a predetermined number of clock cycles based on the plurality of delay values, the plurality of rows including the first row, and
   wherein each delay value of the plurality of delay values points to a respective row of the plurality of rows of the RF ultrasound data.

10. The method of claim 9, wherein reading the plurality of rows comprising:
    reading a subset of the plurality of rows in one clock cycle of the clock cycles based on a subset of the plurality of delay values,
    wherein the subset of the plurality of rows corresponds to the subset of the plurality of delay values, and
    wherein the subset of the plurality of rows corresponds to a total number of the plurality of subaperture elements divided by the predetermined number of clock cycles.

11. The method of claim 10, further comprising:
    generating a plurality of memory buffers, each memory buffer corresponding to the subset of the plurality of delay values, each memory buffer of the plurality of memory buffers comprising the plurality of rows.

12. The method of claim 10, further comprising:
    vertically stacking the subset of the plurality of rows according to a lateral distance between a target of the subset and a receive element in the transducer array for each of the subset; and
    diagonally summing the subset to generate a partial beamformed row of the beamformed data at the particular depth.

13. The method of claim 12, wherein reading the plurality of rows comprising:
    reading other subsets of the plurality of rows based on other subsets of the plurality of delay values,
    wherein the method further comprises:
    vertically stacking each of the other subsets;
    diagonally summing each of the other subsets to generate other partial beamformed rows of the beamformed data at the particular depth; and
    summing the partial beamformed row and the other partial beamformed rows to generate a beamformed row of the beamformed data at the particular depth.

14. The method of claim 13, wherein the partial beamformed row comprises a plurality of first beamformed RF data samples,
    wherein each of the other partial beamformed rows comprises a plurality of second beamformed RF data samples,
    wherein summing the partial beamformed row and the other partial beamformed rows comprising:
    summing the plurality of first beamformed RF data samples and the plurality of second beamformed RF data samples of each of the other partial beamformed rows to generate a beamformed row of the beamformed data at the particular depth.

15. A system for ultrafast ultrasound imaging comprising:
    a memory storing a delay profile matrix, wherein each row of the delay profile matrix comprises a delay profile corresponding to a different depth;
    a field programmable gate array (FPGA) coupled to the memory and configured to:
    receive radio frequency (RF) ultrasound data acquired from a subject;

load a delay profile from the delay profile matrix to a memory buffer of the FPGA, wherein the delay profile corresponds to a particular depth;

read a first row of the RF ultrasound data based on a first delay value of the delay profile;

generate beamformed data at the particular depth by beamforming the first row of RF ultrasound data; and generate an image of the subject based on the beamformed data.

16. The system of claim 15, wherein the delay profile comprises a plurality of delay values, the plurality of delay values corresponding to a plurality of subaperture elements in a transducer array.

17. The system of claim 16, wherein to read the first row, the FPGA is configured to:

read a plurality of rows of the RF ultrasound data based on the plurality of delay values, the plurality of rows including the first row, and wherein each delay value of the plurality of delay values points to a respective row of the plurality of rows of the RF ultrasound data.

18. The system of claim 17, wherein the FPGA is further configured to:

generate a plurality of memory buffers corresponding to the plurality of rows, each memory buffer of the plurality of memory buffers comprising the plurality of rows, and wherein the plurality of rows is read in one clock cycle.

19. The system of claim 17, wherein the FPGA is further configured to:

vertically stack the plurality of rows according to a lateral distance between a target of the plurality of rows and a receive element in the transducer array for each of the plurality of rows; and diagonally sum the plurality of rows to generate a beamformed row of the beamformed data at the particular depth.

20. The system of claim 19, wherein each row of the plurality of rows comprises a plurality of RF data samples, the plurality of RF data samples corresponding to a plurality of elements of the transducer array, wherein to diagonally sum the plurality of rows, the FPGA is configured to:

sum an RF data sample in a row of the plurality of rows corresponding to a first element of the plurality of elements and a corresponding RF data sample in another row the plurality of rows corresponding to a second element of the plurality of elements, the another row being adjacent to the row, the second element being adjacent to the first element.

* * * * *